United States Patent
Koseoglu et al.

(10) Patent No.: US 11,549,065 B2
(45) Date of Patent: Jan. 10, 2023

(54) ADSORPTION SYSTEMS AND PROCESSES FOR RECOVERING PNA AND HPNA COMPOUNDS FROM PETROLEUM BASED MATERIALS AND REGENERATING ADSORBENTS

(71) Applicant: Saudi Arabian Oil Company, Dhahran (SA)

(72) Inventors: Omer Refa Koseoglu, Dhahran (SA); Ali Alzaid, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 71 days.

(21) Appl. No.: 17/143,342

(22) Filed: Jan. 7, 2021

(65) Prior Publication Data
US 2022/0213391 A1 Jul. 7, 2022

(51) Int. Cl.
*C10G 25/00* (2006.01)
*B01D 3/14* (2006.01)
(Continued)

(52) U.S. Cl.
CPC .......... *C10G 25/003* (2013.01); *B01D 3/143* (2013.01); *B01D 15/203* (2013.01); *B01J 19/245* (2013.01);
(Continued)

(58) Field of Classification Search
CPC .................. C10G 25/003; C10G 53/12; C10G 2300/1074; C10G 2300/202; B01D 3/143;
(Continued)

(56) References Cited

U.S. PATENT DOCUMENTS 3,450,629 A 6/1969 Sudduth et al.
3,619,407 A 11/1971 Hendricks et al.
(Continued)

FOREIGN PATENT DOCUMENTS

WO 2004050800 A1 6/2004

OTHER PUBLICATIONS

The Book and Paper Group, vol. three 1984, Solubility Parameters: Theory and Application (Year: 1984).*
(Continued)

*Primary Examiner* — Randy Boyer
*Assistant Examiner* — Juan C Valencia
(74) *Attorney, Agent, or Firm* — Dinsmore & Shohl, LLP

(57) ABSTRACT

A process for treating a hydrocarbon stream to remove polynuclear aromatic (PNA) and heavy polynuclear aromatic (HPNA) compounds includes contacting the hydrocarbon stream with an adsorbent in an adsorption unit to adsorb the PNA and HPNA compounds onto the adsorbent to produce a treated hydrocarbon stream and regenerating the adsorbent. Regenerating the adsorbent may include contacting the adsorbent with a solvent comprising a disulfide oil, such as a disulfide oil effluent from a mercaptan oxidation unit. The solvent comprising the disulfide oil desorbs the PNA and HPNA compounds from the adsorbent into the solvent to produce a desorption effluent. The treated hydrocarbon stream can be passed to a hydrocracking unit that hydrocracks the treated hydrocarbon stream to produce a hydrocracker effluent that includes greater value petrochemical products or intermediates.

20 Claims, 3 Drawing Sheets

(51) Int. Cl.
  *B01D 15/20* (2006.01)
  *B01J 19/24* (2006.01)
  *B01J 20/20* (2006.01)
  *B01J 20/34* (2006.01)
  *C10G 53/12* (2006.01)

(52) U.S. Cl.
  CPC .......... *B01J 20/20* (2013.01); *B01J 20/3416* (2013.01); *B01J 20/3475* (2013.01); *C10G 53/12* (2013.01); *B01J 2219/0004* (2013.01); *C10G 2300/1074* (2013.01); *C10G 2300/202* (2013.01)

(58) Field of Classification Search
  CPC ....... B01D 15/203; B01J 19/245; B01J 20/20; B01J 20/3416; B01J 20/3475; B01J 2219/0004
  See application file for complete search history.

(56) References Cited

U.S. PATENT DOCUMENTS

| | | |
|---|---|---|
| 4,447,315 A | 5/1984 | Lamb et al. |
| 4,954,242 A | 9/1990 | Gruia |
| 4,961,839 A | 10/1990 | Stine et al. |
| 5,120,427 A | 6/1992 | Stine et al. |
| 5,139,644 A | 8/1992 | Gruia |
| 5,139,646 A | 8/1992 | Gruia |
| 5,276,231 A | 1/1994 | Kocal et al. |
| 7,763,163 B2 | 7/2010 | Koseoglu |
| 8,343,334 B2 | 1/2013 | Koseoglu |
| 8,828,219 B2 | 9/2014 | Koseoglu |
| 9,023,192 B2 | 5/2015 | Koseoglu |
| 9,388,347 B2 | 7/2016 | Ramaseshan et al. |
| 9,394,493 B2 | 7/2016 | Koseoglu |
| 9,534,179 B2 | 1/2017 | Koseoglu |
| 9,580,663 B2 | 2/2017 | Low et al. |
| 9,663,732 B2 | 5/2017 | Ganyu |
| 9,701,912 B2 | 7/2017 | Hoehn et al. |
| 9,783,748 B2 | 10/2017 | Harvey et al. |
| 9,803,147 B2 | 10/2017 | Bhattacharya et al. |
| 9,914,889 B2 | 3/2018 | Hoehn et al. |
| 9,944,863 B2 | 4/2018 | Zhang et al. |
| 10,011,786 B1 | 7/2018 | Eizenga et al. |
| 10,301,560 B2 | 5/2019 | Wang et al. |
| 10,435,635 B2 | 10/2019 | Hoehn et al. |
| 10,533,142 B2 | 1/2020 | Sauge et al. |
| 2008/0093260 A1 | 4/2008 | Koseoglu |
| 2009/0120842 A1 | 5/2009 | Koseoglu et al. |
| 2012/0187027 A1* | 7/2012 | Koseoglu .............. C10G 67/14 208/91 |
| 2013/0109895 A1 | 5/2013 | Novak et al. |
| 2014/0048447 A1 | 2/2014 | Hoehn et al. |
| 2015/0008159 A1 | 1/2015 | Adams et al. |
| 2016/0010005 A1 | 1/2016 | Koseoglu |
| 2018/0187100 A1 | 7/2018 | Koseoglu |
| 2020/0181073 A1 | 6/2020 | Koseoglu et al. |
| 2020/0377806 A1 | 12/2020 | Koseoglu et al. |
| 2021/0246386 A1 | 8/2021 | Koseoglu |

OTHER PUBLICATIONS

Notification of Transmittal of the International Search Report and the Written Opinion of the International Searching Authority, or the Declaration dated Mar. 18, 2022 pertaining to International application No. PCT/US2021/063512, filed Dec. 15, 2021, 14 pages.

International Search Report and Written Opinion dated Feb. 18, 2022 pertaining to International application No. PCT/US2021/059912 filed Nov. 18, 2021, 14 pages.

U.S. Notice of Allowance and Fee(s) Due dated Mar. 10, 2022 pertaining to U.S. Appl. No. 17/143,279, filed Jan. 7, 2021, 15 pages.

* cited by examiner

ADSORPTION SYSTEMS AND PROCESSES FOR RECOVERING PNA AND HPNA COMPOUNDS FROM PETROLEUM BASED MATERIALS AND REGENERATING ADSORBENTS

BACKGROUND

Field

The present disclosure relates to systems and processes for processing petroleum-based materials and, in particular, systems and processes for removing and recovering polynuclear aromatic compounds, heavy polynuclear aromatic compounds, or both from petroleum-based materials.

Technical Background

Petroleum-based materials can be converted to petrochemical products, such as fuel blending components, olefins, and aromatic compounds, which are basic intermediates for a significant portion of the petrochemical industry. The increasing worldwide demand for olefins and aromatic compounds remains a major challenge for many integrated refineries. In particular, olefins are considered the building blocks of polymer synthesis and, as a result, the demand for the production of particularly valuable olefins, such as ethylene, propene, and butenes, has increased significantly in recent years. Additionally, aromatic compounds are used as intermediates for polymer synthesis and the production of other organic compounds, such as fuel additives, which has resulted in a similar increase in demand for the production of valuable aromatic compounds, such as benzene, toluene, ethylbenzene, and xylene.

Petroleum-based materials may be converted into petrochemical products through hydrocracking. Generally, hydrocracking processes can include simultaneously cracking and hydrogenating hydrocarbons to produce products with lesser molecular weights and increased hydrogen to carbon ratios compared to the starting petroleum-based materials. Typical hydrocarbon feeds for hydrocracking processes can include minor amounts of small polynuclear aromatic compounds (PNA); however, larger polynuclear aromatic hydrocarbons, referred to as heavy polynuclear aromatic compounds (HPNA), can form during hydrocracking processes and can be present in significant concentrations in the heavier fractions of hydrocracked effluents. The formation of heavy polynuclear aromatic compounds may result in the precipitation and buildup of heavy polynuclear aromatic compounds, which can cause the fouling of components of the hydrocracking system and downstream process equipment.

SUMMARY

Accordingly, there is an ongoing need for systems and processes for removing and recovering polynuclear aromatic compounds, heavy polynuclear aromatic compounds, or both from hydrocarbon streams. Additionally, there is an ongoing need for systems and processes for upgrading or converting petroleum-based materials to petrochemical products through hydrocracking while also reducing or preventing the formation and buildup of heavy polynuclear aromatic compounds, which can cause fouling of components of the hydrocracking system and downstream process equipment.

The systems and processes of the present disclosure may reduce or prevent the formation and buildup of heavy polynuclear aromatic (HPNA) compounds by removing HPNA compounds from hydrocracker bottom effluents from hydrocracking processes before recycling them back to the hydrocracking unit, by removing HPNA precursors such as polynuclear aromatic (PNA) compounds from hydrocarbon feeds to the hydrocracking processes, or both. The systems and processes of the present disclosure include an adsorption system comprising at least one adsorption unit operable to contact a hydrocarbon feed, a hydrocracker bottom effluent, or both with an adsorbent to adsorb PNA compounds, HPNA compounds, or both from these streams.

Adsorbents can be regenerated by passing a solvent through the adsorbent in the adsorption unit to desorb the PNA compounds and HPNA compounds from the adsorbent. Conventional adsorption processes may use solvents such as benzene, toluene, xylene, tetrahydrofuran, or combinations of these. However, these chemicals have greater value as commodity chemicals or valuable chemical intermediates for producing various products. Thus, use of these solvents to desorb the PNA and HPNA compounds from the adsorbents is an inefficient use of greater value petrochemical materials.

The systems and processes of the present disclosure include a mercaptan oxidation (MEROX) process for converting mercaptans in a mercaptan-containing hydrocarbon stream to disulfide oil. The inventors of the present disclosure have discovered that the disulfide oil has sufficient solubility for PNA compounds and HPNA compounds to efficiently desorb these compounds from the adsorbent. Disulfide oil is a mixture of disulfide compounds and may be produced through oxidation of mercaptans. The disulfide oil from a MEROX unit may even have greater solubility for PNA and HPNA compounds compared to the conventional solvents such as but not limited to benzene, toluene, xylene, and tetrahydrofuran. Thus, the systems and processes of the present disclosure include passing at least a portion of disulfide oil recovered from a MEROX unit to the adsorption unit for regeneration of the adsorbent.

According to at least one aspect of the present disclosure, a process for treating a hydrocarbon stream to remove polynuclear aromatic compounds, heavy polynuclear aromatic compounds, or both may include contacting the hydrocarbon stream with an adsorbent in an adsorption unit, where the contacting causes at least a portion of the polynuclear aromatic compounds, heavy polynuclear aromatic compounds, or both in the hydrocarbon stream to be adsorbed onto the adsorbent to produce a treated hydrocarbon stream. The process may further include regenerating the adsorbent in the adsorption unit. Regenerating the adsorbent may include at least ceasing contact of the hydrocarbon stream with the adsorbent and contacting the adsorbent with a solvent comprising a disulfide oil. Contacting the adsorbent with the solvent comprising the disulfide oil may desorb at least a portion of the polynuclear aromatic compounds, the heavy polynuclear aromatic compounds, or both from the adsorbent into the solvent to produce a desorption effluent comprising the at least a portion of the polynuclear aromatic compounds, the heavy polynuclear aromatic compounds, or both.

According to one or more other aspects of the present disclosure, a process for upgrading a hydrocarbon feed may include contacting the hydrocarbon feed with an adsorbent in an adsorption unit, where the contacting causes at least a portion of polynuclear aromatic compounds, heavy polynuclear aromatic compounds, or both in the hydrocarbon feed to be adsorbed onto the adsorbent to produce a treated hydrocarbon stream. The process may further include contacting at least a portion of the treated hydrocarbon stream with hydrogen in the presence of at least one hydrocracking catalyst to produce a hydrocracker effluent and separating the hydrocracker effluent into at least one upgraded effluent and a hydrocracker bottom stream. The process may further include regenerating the adsorbent in the adsorption unit. Regenerating the adsorbent may include contacting the adsorbent with a solvent comprising a disulfide oil, where contacting the adsorbent with the solvent comprising the disulfide oil may desorb at least a portion of the polynuclear aromatic compounds, heavy polynuclear aromatic compounds, or both from the adsorbent into the solvent to produce a desorption effluent comprising the at least a portion of the polynuclear aromatic compounds, heavy polynuclear aromatic compounds, or both.

According to one or more other aspects of the present disclosure, a system for processing a hydrocarbon feed may include an adsorption unit comprising an adsorbent and operable to contact the hydrocarbon feed with the adsorbent to adsorb at least a portion of polynuclear aromatic compounds, heavy polynuclear aromatic compounds, or both from the hydrocarbon feed to produce a treated hydrocarbon stream. The system may further include a hydrocracking unit disposed downstream of the adsorption unit and comprising at least one hydrocracking catalyst. The hydrocracking unit may be operable to contact at least a portion of the treated hydrocarbon stream with hydrogen in the presence of the at least one hydrocracking catalyst at conditions sufficient to convert at least a portion of the treated hydrocarbon stream to produce a hydrocracked effluent comprising hydrocarbons having a boiling point temperature less than or equal to 370° C. The system may further include a mercaptan oxidation unit that may be operable to convert at least a portion of mercaptan in a mercaptan-containing hydrocarbon stream to disulfide oil. The mercaptan oxidation unit may be in fluid communication with the adsorption unit to pass at least a portion of a disulfide oil effluent from the mercaptan oxidation unit to the adsorption unit as at least a portion of a solvent for regeneration of the adsorbent.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawings in which.

Figure 1:
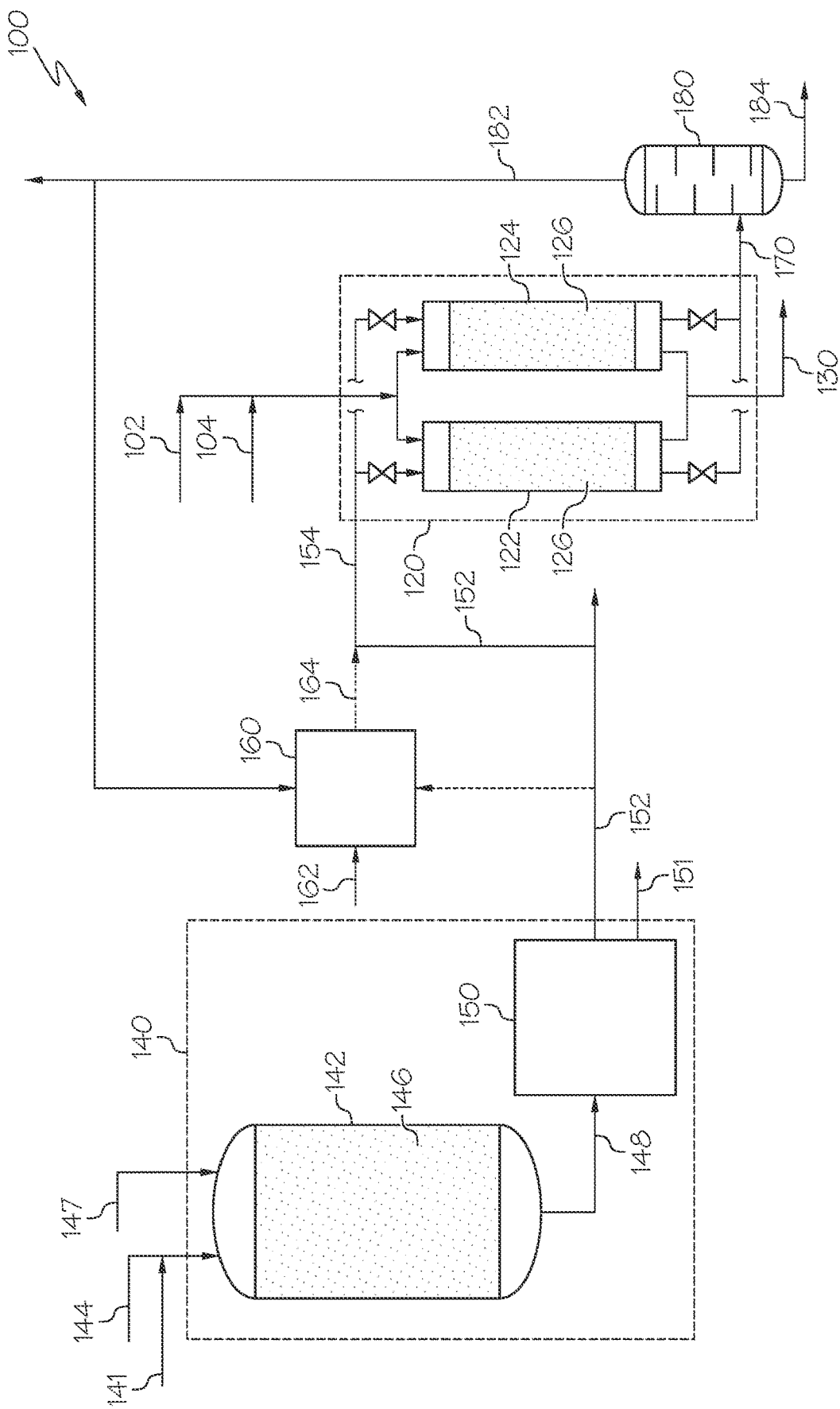
FIG. 1 schematically depicts a generalized flow diagram of an adsorption system and process for removing and recovering PNA compounds and HPNA compounds from a hydrocarbon feed, recycle stream, or both, according to one or more aspects shown and described in the present disclosure.
Figure 2:
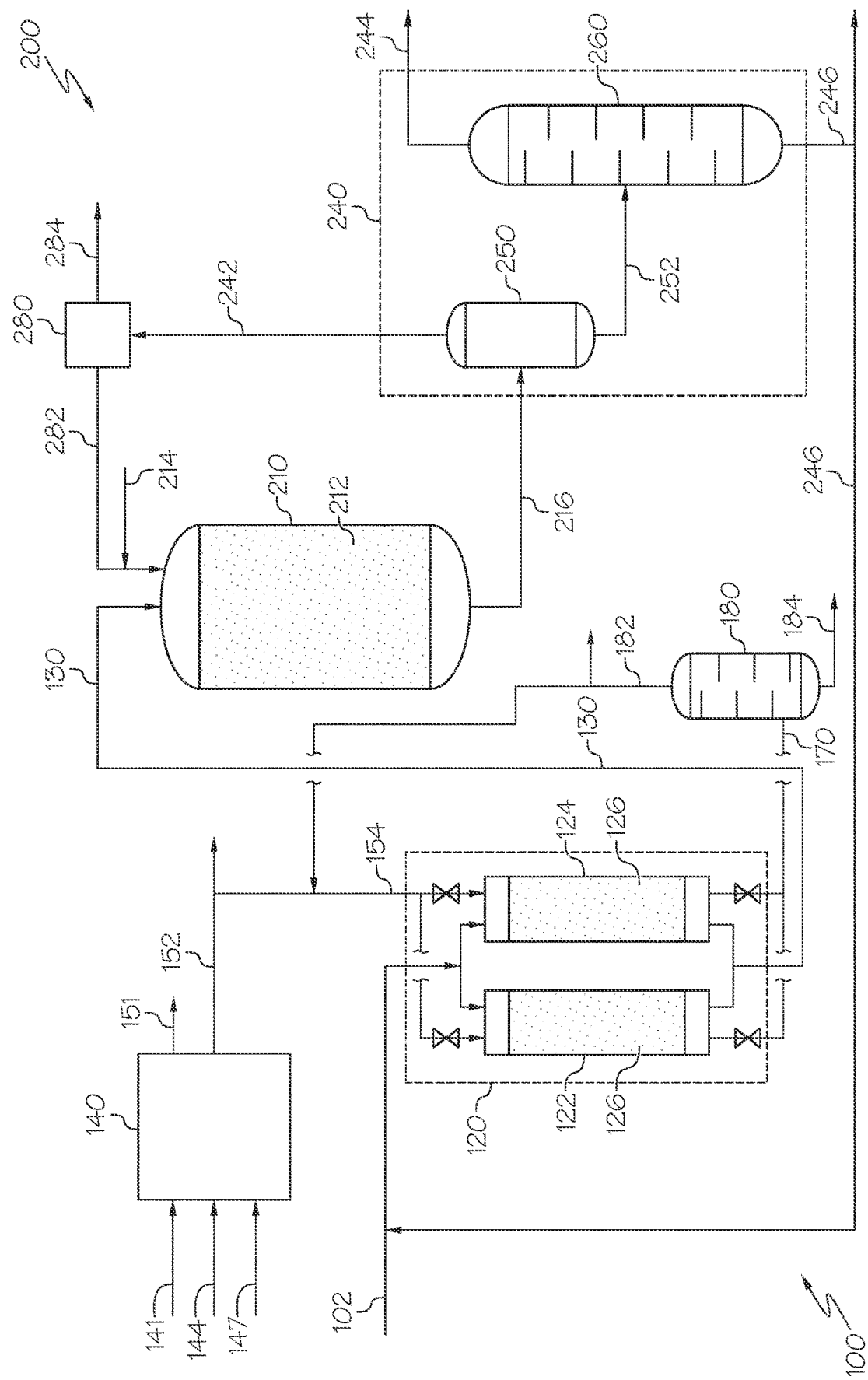
FIG. 2 schematically depicts a generalized flow diagram of a hydrocracking system and process for upgrading hydrocarbons through hydrocracking, where the hydrocracking system includes the adsorption system of FIG. 1, according to one or more aspects shown and described in the present disclosure.
Figure 3:
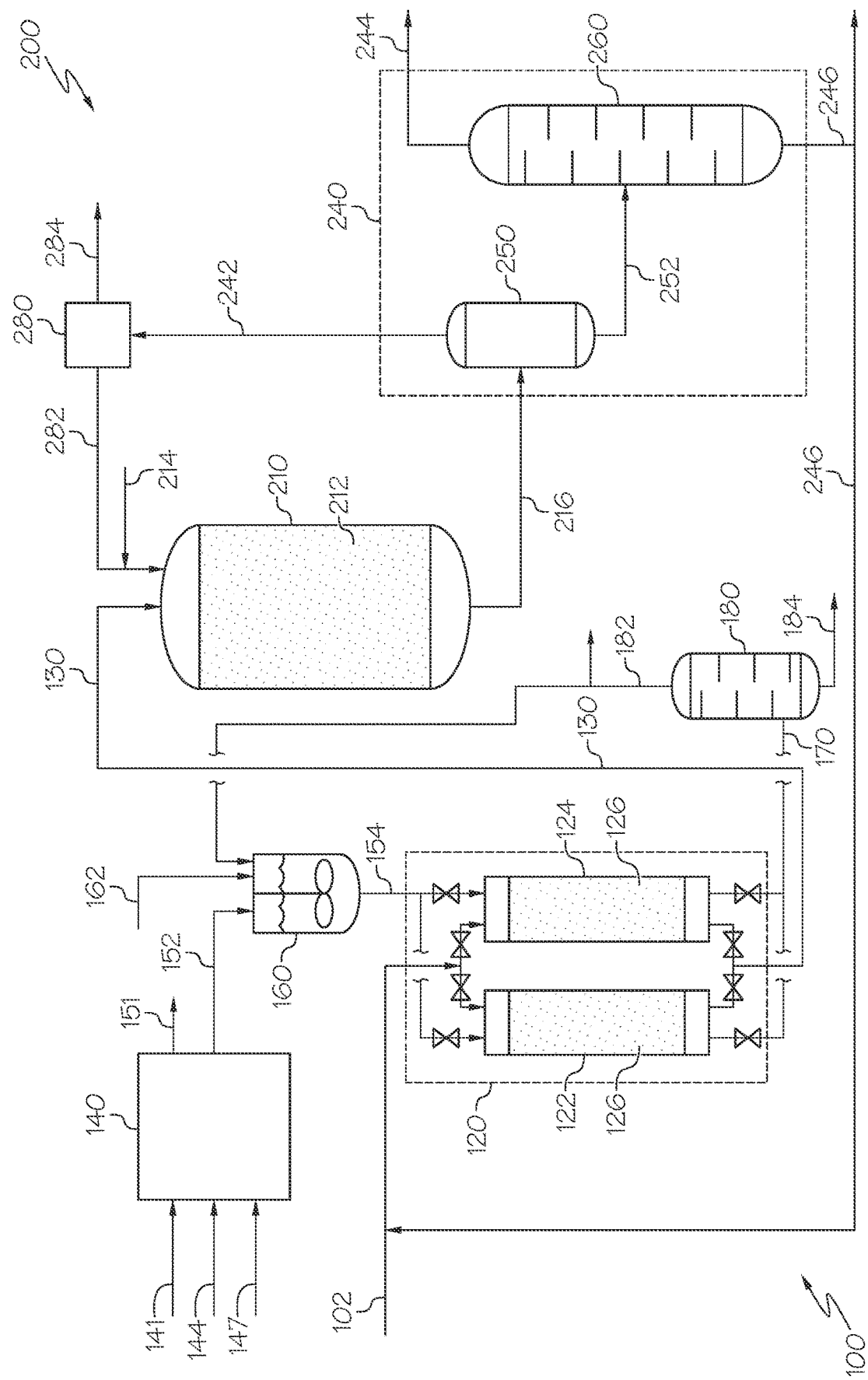
FIG. 3 schematically depicts a generalized flow diagram of another hydrocracking system and process for upgrading hydrocarbons, where the hydrocracking system includes the adsorption system of FIG. 1, according to one or more aspects shown and described in the present disclosure.

When describing the simplified schematic illustrations of FIGS. 1-3, many of the numerous valves, temperature sensors, electronic controllers, and the like, which may be used and are well known to a person of ordinary skill in the art, may not be included. Further, accompanying components that are often included in systems such as those depicted in FIGS. 1-3, such as air supplies, heat exchangers, surge tanks, and the like are also not included. However, a person of ordinary skill in the art understands that these components are within the scope of the present disclosure.

Additionally, the arrows in the simplified schematic illustrations of FIGS. 1-3 refer to process streams. However, the arrows may equivalently refer to transfer lines, which may transfer process streams between two or more system components. Arrows that connect to one or more system components signify inlets or outlets in the given system components and arrows that connect to only one system component and signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustrations of FIGS. 1-3 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Moreover, two or more lines intersecting in the simplified schematic illustrations of FIGS. 1-3 refer to two or more process streams being "mixed" or "combined". Mixing or combining two or more process streams may comprise mixing or combining by directly introducing both streams into a like reactor, separation device, or other system component. For example, two lines intersecting prior to entering a system component may signify the introduction of the two process streams into the system component, in which mixing or combining occurs.

Reference will now be made in greater detail to various aspects of the present disclosure, some of which are illustrated in the accompanying drawings.

DETAILED DESCRIPTION

The present disclosure is directed to systems and processes for upgrading hydrocarbon feeds to produce more valuable petrochemical products, such as fuels or chemical intermediates. In particular, the present disclosure is directed to adsorption systems and processes for removing and recovering heavy polynuclear aromatic compounds (HPNA) and polynuclear aromatic compounds (PNA), which may be precursors of the HPNA compounds, from hydrocarbon feeds, recycle streams from hydrocracking units, or both. Additionally, the present disclosure may also be directed to hydrocracking systems and processes for upgrading a hydrocarbon feed to more valuable petrochemical products through hydrocracking processes that include the adsorption systems and processes for removing and recovering the HPNA compounds, PNA compounds, or both.

Referring now to FIG. 1, an adsorption system 100 of the present disclosure for treating a hydrocarbon feed 102 to remove PNA compounds, HPNA compounds, or both includes an adsorption unit 120 comprising at least one adsorbent 126 and operable to contact the hydrocarbon feed 102 with the adsorbent 126 to adsorb at least a portion of the PNA compounds, HPNA compounds, or both from the hydrocarbon feed 102 to produce a treated hydrocarbon stream 130. The system 100 may further include a mercaptan oxidation unit 140 (MEROX unit) operable to convert at least a portion of mercaptans in a mercaptan-containing hydrocarbon stream 141 to disulfide oil. The MEROX unit 140 may be in fluid communication with the adsorption unit 120 to pass at least a portion of a disulfide oil effluent 152 from the MEROX unit 140 to the adsorption unit 120 as at least a portion of a solvent 154 for regeneration of the adsorbent 126. Referring to FIG. 2, the adsorption system 100 may be integrated into a hydrocracking system 200 for processing the hydrocarbon feed 102 to produce one or more upgraded effluents 244. The hydrocracking system 200 may include the adsorption system 100 and a hydrocracking unit 210 downstream of the adsorption system 100, in particular, downstream of the adsorption unit 120. The hydrocracking unit 210 may comprise at least one hydrocracking catalyst 212 and may be operable to contact at least a portion of the treated hydrocarbon stream 130 with hydrogen in the presence of the hydrocracking catalyst 212 at conditions sufficient to convert at least a portion of the treated hydrocarbon stream 130 to produce a hydrocracked effluent 216 comprising upgraded hydrocarbons having a greater proportion of constituents having boiling point temperature less than or equal to 370° C. The upgraded hydrocarbons may include greater value petrochemical products and intermediates.

Referring again to FIG. 1, processes for treating a hydrocarbon stream, such as the hydrocarbon feed 102, a recycle stream 104, or both to remove PNA compounds, HPNA compounds, or both can include contacting the hydrocarbon stream with the adsorbent 126 in the adsorption unit 120, where the contacting causes at least a portion of the PNA compounds, HPNA compounds, or both in the hydrocarbon stream to be adsorbed onto the adsorbent 126 to produce a treated hydrocarbon stream 130. The process further includes regenerating the adsorbent 126 in the adsorption unit 120. Regenerating the adsorbent 126 may include at least ceasing contact of the hydrocarbon stream with the adsorbent 126 and contacting the adsorbent 126 with a solvent 154 comprising a disulfide oil, where contacting the adsorbent 126 with the solvent 154 comprising the disulfide oil desorbs at least a portion of the PNA compounds, the HPNA compounds, or both from the adsorbent 126 into the solvent 154 to produce a desorption effluent 170, which may include the at least a portion of the PNA compounds, the HPNA compounds, or both. Referring to FIG. 2, processes for upgrading the hydrocarbon feed 102 may include contacting the hydrocarbon feed 102 with the adsorbent 126 as previously discussed to produce the treated hydrocarbon stream 130 and contacting at least a portion of the treated hydrocarbon stream 130 with hydrogen in the presence of at least one hydrocracking catalyst 212 in a hydrocracking unit 210 to produce a hydrocracker effluent 216. The processes for upgrading the hydrocarbon feed 102 may further include separating the hydrocracker effluent 216 into at least one upgraded effluent 244 and a hydrocracker bottom stream 246. The hydrocracker bottom stream 246 may be passed back to the adsorption unit 120 for treatment. The processes for upgrading the hydrocarbon feed 102 may further include regenerating the adsorbent 126 in the adsorption unit 120 with the solvent 154 comprising the disulfide oil to desorb at least a portion of the PNA compounds, HPNA compounds, or both from the adsorbent 126.

The adsorption systems and processes of the present disclosure may improve desorption and recovery of PNA compounds and HPNA compounds from the adsorbent 126 after treating the hydrocarbon feed 102, hydrocracker bottom stream 246, or both in the adsorption unit 120. The desorption of these compounds can be improved by using disulfide oil produced by the MEROX unit 140 as all or a portion of the solvent 154 for regenerating the adsorbent. The disulfide oil may have a greater solubility for the PNA and HPNA compounds compared to conventional desorption solvents, such as benzene for example. Additionally, using the disulfide oil from the MEROX unit 140 as at least a portion of the solvent 154 for regenerating the adsorbent 126 may provide a more efficient and beneficial use of the disulfide oil compared to treating or disposing of the disulfide oil and may reduce the consumption of greater value commodity solvents, such as benzene, toluene, xylene, or tetrahydrofuran in regenerating the adsorbents. Adsorption of PNA and HPNA compounds from the hydrocarbon feed 102, the hydrocracker bottom stream 246, or both in the hydrocracking system 200 may reduce or prevent formation and buildup of HPNA compounds in the hydrocracking system 200 and downstream processing equipment, which may reduce fouling and increase product yield, among other features.

As used in the present disclosure, the term "reactor" refers to any vessel, container, or the like, in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors, such as fixed bed reactors, and ebullated bed reactors. One or more "reaction zones" may be disposed within a reactor. As used in the present disclosure, the term "reaction zone" refers to an area where a particular reaction takes place in a reactor. For example, a packed bed reactor with multiple catalyst beds may have multiple reaction zones, where each reaction zone is defined by the area of each catalyst bed.

As used in the present disclosure, a "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

As used in the present disclosure, the term "end boiling point" or "EBP" of a composition refers to the temperature at which the greatest boiling temperature constituents of the composition transition from the liquid phase to the vapor phase.

As used in the present disclosure, the term "effluent" refers to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slip stream may carry some of the effluent away, meaning that only a portion of the effluent may enter the downstream system unit. The term "reaction effluent" may more particularly be used to refer to a stream that is passed out of a reactor or reaction zone.

As used in the present disclosure, the term "catalyst" refers to any substance which increases the rate of a specific chemical reaction. Catalysts described in the present disclosure may be utilized to promote various reactions, such as hydrotreating reactions, hydrocracking reactions, or both. The term "hydrotreating" refers to treatments of hydrocarbon streams through contact with hydrogen in the presence of one or more hydrotreating catalysts to remove contaminants, such as metal compounds, sulfur-containing hydrocarbons, and nitrogen-containing hydrocarbons, or otherwise condition or upgrade the hydrocarbon streams for further processing. The term "hydrocracking" refers to the cracking of hydrocarbons conducted in the presence of hydrogen. The term "cracking" refers to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality.

As used in the present disclosure, the term "polynuclear aromatic compounds" (abbreviated PNA) refers to compounds containing less than seven fused hydrocarbon rings. As used in the present disclosure, the term "fused" refers to a hydrocarbon ring comprising two or more carbon atoms in the hydrocarbon ring that are shared with an adjacent hydrocarbon ring, rather than being coupled to the adjacent hydrocarbon ring by an alkyl group, commonly referred to as a carbon bridge. Compounds comprising fused hydrocarbon rings may also be referred to as condensed aromatics and compounds comprising hydrocarbon rings coupled by a carbon bridge may also be referred to as uncondensed aromatics. For example, naphthalene is a polynuclear aromatic hydrocarbon having two fused hydrocarbon rings compared to biphenyl, which has two hydrocarbon rings coupled by an alkyl group and is not a polynuclear aromatic hydrocarbon.

As used in the present disclosure, the term "heavy polynuclear aromatic compounds" (abbreviated HPNA) refers to fused polycyclic aromatic compounds having seven or more fused hydrocarbon rings and double bond equivalence (DBE) values of 19 and above. As used in the present disclosure, the term "double bond equivalence" refers to the sum of the number of double bonds and the number of hydrocarbon rings of a compound. For example, coronene, which has 7 hydrocarbon rings and 12 double bonds has a double bond equivalence of 19. Examples of heavy polynuclear aromatics include coronenes, benzocoronenes, dibenzocoronenes, and ovalenes. The aromatic structures of heavy polynuclear aromatics may include attached alkyl groups and naphthenic rings.

It should be understood that the reactions promoted by catalysts as described in the present disclosure may remove a chemical constituent, such as only a portion of a chemical constituent, from a process stream or may react all or only a portion of reactants in a reactor feed. For example, the systems and processes of the present disclosure may comprise a catalyst in an amount sufficient to promote a cracking reaction that may convert larger hydrocarbon molecules into smaller hydrocarbon molecules. It should be understood that, throughout the present disclosure, a particular catalyst may not be limited in functionality to the removal, conversion, or cracking of a particular chemical constituent or moiety when it is referred to as having a particular functionality. For example, a catalyst identified in the present disclosure may provide hydrotreating functionality, hydrocracking functionality, or both.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

As previously discussed, hydrocracking processes are used commercially in a large number of petroleum refineries. Hydrocracking processes can be used to process a variety of hydrocarbon feeds having boiling point temperatures in the range of 370° C. to 520° C. in conventional hydrocracking units and boiling point temperatures greater than or equal to 520° C. in residue hydrocracking units. During hydrocracking, hydrocarbon molecules from the hydrocarbon feed may be split into smaller, lighter molecules having lesser molecular weight, greater average volatility, and greater economic value. Additionally, hydrocracking processes can improve the quality of the hydrocarbon feedstock by increasing the hydrogen to carbon ratio and removing organosulfur and organonitrogen compounds.

In addition to sulfur-containing and nitrogen-containing compounds, a typical hydrocracking feed, such as vacuum gas oil (VGO), can contain small amounts of PNA compounds. A typical hydrocarbon feed to a hydrocracking process may include VGO that includes constituents having boiling point temperatures in the range of 370° C. to 520° C. Heavier hydrocarbon feeds, such as de-metalized oil (DMO) or de-asphalted oil (DAO), can be blended or combined with the VGO or used as is and processed in a hydrocracking unit. For instance, a hydrocarbon feed to a hydrocracking unit can include VGO that may contain from 10 volume percent (vol %) to 25 vol % DMO or DAO based on the total volume of the hydrocarbon feed. 100% DMO or DAO can also be processed in a hydrocracking unit. However, the heavier hydrocarbon feeds, such as DMO or DAO, can have much higher concentrations of nitrogen, sulfur, and PNA compounds compared to VGO feedstreams. For instance, the DMO or DAO streams can contain significantly more nitrogen compounds (2,000 parts per million by weight (ppmw) vs. 1,000 ppmw for VGO) and a greater micro carbon residue (MCR) content than the VGO stream (10 weight percent (wt. %) vs. 1 wt. % for VGO). These impurities can lower the overall efficiency of hydrocracking unit by requiring higher operating temperature, higher hydrogen partial pressure or additional reactor/catalyst volume. In addition, high concentrations of impurities can accelerate catalyst deactivation.

As the hydrocarbon feed is subjected to hydrocracking at elevated temperature and pressure, HPNA compounds can form and may be present in high concentrations in the unconverted hydrocracker bottoms. The formation of HPNA compounds is an undesirable side reaction that occurs in hydrocracking units, in particular recycle hydrocracking units. HPNA compounds are typically formed during hydrocracking by the dehydrogenation of aromatic hydrocarbons or the cyclization of side chains onto existing PNA hydrocarbons, which is followed by dehydrogenation. Generally, the amount of HPNA compounds formed during a hydrocracking process correlates directly to the severity of the hydrocracking process with HPNA formation increasing with increasing reaction temperature. HPNA formation depends on many factors including the type of feedstock, catalyst selection, process configuration, and operating conditions. Since HPNAs accumulate in the recycle system and then cause equipment fouling, controlling HPNA formation in the hydrocracking process can greatly improve efficiency and operation of the hydrocracking processes.

The HPNA compounds usually form when zeolitic catalysts are employed in the hydrocracking process. The molecules of HPNA compounds are large enough that they are not able to penetrate into the pores of the zeolitic catalyst to undergo cracking reactions. Thus, the HPNA compounds can build-up in the hydrocracker bottom stream recycled back to the hydrocracking unit. HPNA compounds have a limited solubility in the hydrocracker effluent of the hydrocracking zone and may tend to build up in residual or heavy recycle streams present in the process, such as the hydrocracker bottom stream. In addition to build-up in the hydrocracker bottom stream, the HPNA molecules are soluble in the hydrocarbon streams at the reaction conditions. However, when the thermodynamic conditions change, these HPNA compounds can precipitate out of the hydrocarbon solution and deposit on surfaces downstream of the reactor. These materials foul various parts of the refining equipment as they have a very low solubility level in the product hydrocarbons. They tend to accumulate on the cold surfaces of heat exchangers used to recover heat from the effluent of the hydrocracking reaction zone. The coating caused by HPNA deposits may decrease the efficiency of the heat recovery step and may lead to undesirably high pressure drops within the heat exchangers downstream of the hydrocracking unit. In an extreme case, the deposits of HPNA compounds may require halting operation of the hydrocracking unit to clean the heat exchangers. PNA compounds from the hydrocarbon feed may also have a role in the deactivation of the hydrocracking catalyst by acting as a precursor for the "coke" deposits associated with catalyst deactivation. There are several solutions to alleviate this problem including, bleeding some portion of the recycle stream such as the hydrocracker bottom stream, removing the HPNA compounds from the recycle stream or PNA compounds from the hydrocarbon feed through an adsorption process, hydrogenating the HPNA compounds downstream of the hydrocracking process, or other methods.

Referring to FIG. 1, the systems and processes of the present disclosure include an adsorption system 100 comprising an adsorption unit 120 for removing PNA compounds from the hydrocarbon feed, HPNA compounds from the hydrocracker bottom stream recycled back through the hydrocracking process, or both. In the adsorption unit 120, the PNA and HPNA compounds can be removed using adsorbents with large pore volume such as activated carbon, Attapulgus clay, spent catalysts, silica, alumina, titania, zeolites, and the like. In the process, the spent adsorbents can be regenerated using aromatic solvents such as benzene or toluene. Although these solvents are further processed and recycled back to the adsorption unit 120, there are process losses of the solvents due to solubility and inefficient separation of solvents from the oil mixture. The solvent losses increase the processing cost as these solvents are highly priced commodity chemicals.

MEROX units for removing mercaptans from mercaptan-containing hydrocarbon streams can produce a by-product stream of disulfide oil, which is considered a waste product. A disulfide oil may be a mixture of one or more disulfide compounds, such as but not limited to dimethyl disulfide, diethyl disulfide, methylethyl disulfide, or other disulfides. The disulfide oil may include at least 50 wt. %, at least 70 wt. %, at least 90 wt. %, at least 95 wt. %, at least 98 wt. %, or even at least 99 wt. % disulfide compounds based on the total weight of the disulfide oil. Disposal of disulfide oil continues to be a worldwide concern.

In the systems and processes of the present disclosure, the adsorption unit 120 of a hydrocracking system 200 is integrated with a MEROX unit 140 to pass the by-product disulfide oil effluent 152 from the MEROX unit 140 to the adsorption unit 120 for regeneration of the adsorbents 126 to recover the PNA compounds and HPNA compounds adsorbed in the adsorbent used. The disulfide oil effluent 152 from the MEROX unit 140, which has been found to exhibit a greater Hildebrand solubility parameter compared to mono-aromatic solvents such as benzene, toluene and xylenes (BTX), helps to improve desorption of the PNA compound and HPNA compound molecules adsorbed in the adsorption step, thus eliminating the use of expensive commodity solvents such as benzene, toluene, xylenes, or other solvents.

Referring to FIG. 1, an adsorption system 100 operable to remove PNA compounds, HPNA compounds, or both from a hydrocarbon stream is schematically depicted. The adsorption system 100 may include an adsorption unit 120 and a mercaptan oxidation (MEROX) unit 140 disposed upstream of the adsorption unit 120. The MEROX unit 140 may be in fluid communication with the adsorption unit 120 to pass a disulfide oil 152 from the MEROX unit 140 to the adsorption unit 120 for regeneration of the adsorbents 126 in the adsorption unit 120.

The hydrocarbon stream treated in the adsorption system 100 may include a hydrocarbon feed 102, a recycle stream 104, or both. The hydrocarbon feed 102 and the recycle stream 104 will be further described in the present disclosure in relation to FIG. 2. The hydrocarbon feed 102 may be a feed stream to a hydrocracking unit and may contain PNA compounds, which can be converted to HPNA compounds under conditions in the hydrocracking unit, if not removed. The recycle stream 104 may be a stream recovered from a hydrocracked effluent produced by a hydrocracking unit and may include unconverted PNA compounds, HPNA compounds, or both. The recycle stream 104 may include a single recycle stream or a plurality of recycle streams combined upstream of the adsorption unit 120. The hydrocarbon feed 102, the recycle stream 104, or both may be passed directly to the adsorption unit 120. When the hydrocarbon feed 102 and the recycle stream 104 are both treated in the adsorption unit 120, the hydrocarbon feed 102 and the recycle stream 104 may be independently passed directly to the adsorption unit 120 or may be combined upstream of the adsorption unit 120. Other hydrocarbon streams that contain PNA compounds, HPNA compounds, or both may be introduced to the adsorption unit 120 individually or in combination with the hydrocarbon feed 102, the recycle stream 104, or both.

Referring again to FIG. 1, the adsorption unit 120 may be operable to remove at least a portion of the PNA compounds, HPNA compounds, or both from the hydrocarbon stream, such as the hydrocarbon feed 102, the recycle stream 104, or both. The adsorption unit 120 may include a plurality of adsorbent beds or adsorption zones, such as a first adsorption zone 122 and a second adsorption zone 124, which may be arranged in parallel. The adsorption unit 120 is depicted in FIG. 1 as having two adsorption zones for ease of illustration and description. However, the adsorption unit 120 may have greater than or equal to two adsorption zones, such as 2, 3, 4, 5, 6, 7, 8, or more than 8 adsorption zones. Each adsorbent zone may include one or more adsorbents 126, which are materials capable of selectively adsorbing PNA compounds, HPNA compounds, or both from a hydrocarbon stream, such as the hydrocarbon feed 102, the recycle stream 104, or other effluent stream from a hydrocracking process. Each of the adsorption zones may be a packed bed column comprising the at least one adsorbent 126. The packed bed columns may be gravity fed or pressure force-fed and may be operated in parallel or in series. In embodiments, the packed bed columns of the adsorption zones may be operated sequentially in order to permit continuous operation when one adsorption zone is being regenerated, which may be referred to as operating in a "swing" mode.

The adsorbents 126 in the adsorption unit 120 may include adsorbents having large pore volumes to allow the larger HPNA molecules to adsorb into the pores of the adsorbent 126. The adsorbent materials may have a total pore volume of greater than or equal to 1.0 milliliters per gram (ml/g), such as greater than or equal to 1.1 ml/g or greater than or equal to 1.5 ml/g. The adsorbent materials may have a total pore volume of from 1.0 ml/g to 3.0 ml/g, such as from 1.1 ml/g to 3.0 ml/g, or even from 1.5 ml/g to 3.0 ml/g. Adsorbents 126 that may be suitable for the adsorption unit 120 may include, but are not limited to, activated carbon, alumina, silica-alumina, titania, zeolites, silica, silica gels, clays such as Attapulgus clay, fresh or spent catalysts, metal nanoparticles, or combinations of these. The adsorbents 126 can be in the form of pellets, spheres, extrudates or natural shapes, having an average size of from 4 mesh to 60 mesh or from 4 mesh to 20 mesh, based on United States Standard Sieve Series.

Referring again to FIG. 1, during operation of the adsorption unit 120 to remove PNA compounds, HPNA compounds, or both, the hydrocarbon feed 102, the recycle stream 104, or both may be passed through one or more of the adsorption zones, such as the first adsorption zone 122, the second adsorption zone 124, or both. In the adsorption zones, the hydrocarbon feed 102, the recycle stream 104, or both may contact the adsorbents 126. Contact of the hydrocarbon feed 102, the recycle stream 104, or both with the adsorbents 126 in the adsorption unit 120 may cause at least a portion of the PNA compounds, HPNA compounds, or both to adsorb into the adsorbents 126 to produce a treated hydrocarbon effluent 130. The adsorption zones of the adsorption unit 120 may be operated at a pressure in the range of from 1 kg/cm$^2$ (98 kilopascals (kPa)) to 30 kg/cm$^2$ (2942 kPa), from 1 kg/cm$^2$ (98 kPa) to 20 kg/cm$^2$ (1961 kPa), or from 1 kg/cm$^2$ (98 kPa) to 10 kg/cm$^2$ (980 kPa). The adsorption zones of the adsorption unit 120 may be operated at a temperature in the range of from 20° C. to 250° C., from 20° C. to 150° C., or from 20° C. to 100° C. Each adsorption zone of the adsorption unit may be operated at a liquid hourly space velocity of from 0.1 h$^{-1}$ to 10 h$^{-1}$, from 0.25 h$^{-1}$ to 5 h$^{-1}$, or from 0.5 h$^{-1}$ to 2 h$^{-1}$.

The treated hydrocarbon effluent 130 may be passed out of the adsorption unit 120. The treated hydrocarbon effluent 130 may have a reduced concentration of PNA compounds, HPNA compounds, or both compared to the hydrocarbon feed 102, the recycle stream 104, or both. The adsorption unit 120 may be operable to remove greater than or equal to 95 percent (%), greater than or equal to 98%, or even greater than or equal to 99% of the PNA compounds from the hydrocarbon feed 102, the recycle stream 104, or combination of these. The treated hydrocarbon effluent 130 may be passed to one or more downstream processing units, such as a hydrocracking unit. Removal of the PNA compounds from the hydrocarbon feed 102, the recycle stream 104, or both to produce the treated hydrocarbon effluent 130 may reduce or prevent formation of HPNA compounds from the PNA compounds during a downstream hydrocracking process. The adsorption unit 120 may be operable to remove greater than or equal to 95 percent (%), greater than or equal to 98%, or even greater than or equal to 99% of the HPNA compounds from the hydrocarbon feed 102, the recycle stream 104, or combination of these. Removal of the HPNA compounds from the hydrocarbon feed 102, the recycle stream 104, or both to produce the treated hydrocarbon effluent 130 may reduce buildup of HPNA compounds in a hydrocracking system or other reaction system and may reduce or prevent deposition of HPNA compounds on the surfaces of downstream processing equipment, such as downstream separation units, heat transfer units, or other treatment processes. Removal of HPNA compounds may also reduce or prevent buildup of the HPNA compounds in the recycle stream and reduce coke buildup on downstream hydrocracking catalysts. HPNA compounds can adsorb onto hydrocracking catalysts and then convert into coke under the hydrocracking reaction conditions. Thus, reducing the concentration of the HPNA compounds in the recycle streams can reduce coke buildup on hydrocracking catalysts. Reducing buildup of coke on downstream hydrocracking catalysts caused by the HPNA compounds may reduce deactivation of the hydrocracking catalyst and improve the service life of the hydrocracking catalysts, which may increase the conversion of hydrocarbons from the hydrocarbons feed 102 to increase the yield greater value hydrocarbons, such as but not limited to hydrocarbons having boiling point temperatures less than or equal to 370° C.

As previously discussed, the adsorption unit 120 may include a plurality of adsorption zones, such as the first adsorption zone 122, the second adsorption zone 124, and any additional adsorption zones, which may be arranged in parallel. The adsorption unit 120 may be operated in a swing mode in which the hydrocarbon feed 102, recycle stream 104, or both may be passed through a first subset of the plurality of adsorption zones. When the first subset of adsorption zones becomes saturated, the flow of effluent through the adsorption unit 120 may be transitioned to a second subset of adsorbent zones to allow the first subset of absorbent zones to be regenerated. For example, in reference to FIG. 1, the hydrocarbon feed 102, the recycle stream 104, or both may be passed through the first adsorption zone 122 until the adsorbents 126 in the first adsorption zone 122 become saturated and are no longer effective to remove further PNA compounds and HPNA compounds from the hydrocarbon feed 102, the recycle stream 104, or both. Flow of the hydrocarbon feed 102, the recycle stream 104, or both may be transitioned to the second adsorption zone 124 while the first adsorption zone 122 is regenerated.

The adsorbent beds or zones, such as the first adsorption zone 122 and the second adsorption zone 124, may each be regenerated by passing a solvent 154 through the adsorbents 126 in the adsorption zone. The solvent 154 may include a disulfide oil, such as at least a portion of the disulfide oil effluent 152 produced by the MEROX unit 140. The solvent 154 containing the disulfide oil may desorb at least a portion of the PNA compounds, HPNA compounds, or both from the adsorbents 126 to produce an absorbent regeneration effluent 170. Before contacting the adsorbents 126 with the solvent 154 comprising at least the disulfide oil, regenerating the adsorbents 126 may include contacting the adsorbents with a paraffinic solvent, where contacting desorbs non-PNA and non-HPNA hydrocarbons from pores, void spaces, or both of the adsorbent. Regenerating may further include passing an inert gas through the adsorbents 126 to dry the adsorbents 126 before contacting with the solvent 154 comprising the disulfide oil.

Referring again to FIG. 1, the adsorption system 100 may include the MEROX unit 140 disposed upstream of the adsorption unit 120. The MEROX unit 140 may be operable to convert mercaptans in a mercaptan-containing hydrocarbon stream 141 to one or more disulfides and separate the disulfides from a MEROX effluent 148 to produce a disulfide oil effluent 152. The mercaptans in the mercaptan-containing hydrocarbon stream 141 may be converted to disulfides through oxidation. The MEROX process in all of its applications is based on the ability of an organometallic catalyst to accelerate the oxidation of mercaptans to disulfides at near ambient temperatures and pressures. The overall reaction for conversion of mercaptans to disulfides through oxidation is provided in the following Reaction 1 (RXN 1):

$$RSH + \tfrac{1}{4}O_2 \rightarrow \tfrac{1}{2}RSSR + \tfrac{1}{2}H_2O \qquad \text{(RXN 1)}$$

In RXN 1, R is a hydrocarbon chain that may be straight, branched, or cyclic. The hydrocarbon chains of R may be saturated or unsaturated and may include 1, 2, 3, 4, 5, 6, 7, 8, 9, 10, or more than 10 carbon atoms. Most petroleum fractions containing mercaptans may contain a mixture of mercaptans having different numbers of carbon atoms in the R group. This is indicated by showing R and R' in the following chemical reaction 2 (RXN 2).

$$2R'SH + 2RSH + O_2 \rightarrow 2R'SSR + 2H_2O \qquad \text{(RXN 2)}$$

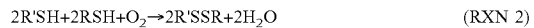

In RXN 2, R and R' have different numbers of carbon atoms. The oxidation reaction of mercaptans occurs spontaneously, but at a very slow rate, whenever any sour mercaptans bearing distillate is exposed to atmospheric oxygen. In addition, mercaptan oxidation according to RXN 1 or RXN 2 may require the presence of an alkaline solution, such as sodium hydroxide (caustic), ammonia, or other alkaline solution, to proceed at economically practical rates at moderate refinery run downstream temperatures.

There are two types of MEROX processes: one for liquid hydrocarbon streams and the second for hydrocarbon streams comprising a combination of gases and liquids. In the liquid MEROX process, the mercaptans present in liquid mercaptan-containing hydrocarbon stream 141 can be converted directly to disulfides, which remain in the product, and there is no reduction in total sulfur content. Because the vapor pressures of disulfides are very low relative to those of mercaptans, the presence of disulfides is much less objectionable. However, the disulfides are not environmentally acceptable and may be difficult to dispose or treat. The liquid MEROX process may utilize a fixed bed reactor system and may be suitable for charge stocks having end boiling points above 135° C. to 150° C. Mercaptans may be converted to disulfides in a fixed bed reactor system over a catalyst, for example, an activated charcoal impregnated with MEROX reagent, and wetted with an alkaline solution, such as a caustic solution. Air or other oxygen-containing gas may be injected into the mercaptan-containing hydrocarbon stream upstream of the MEROX reactor and in passing through the catalyst-impregnated bed, at least a portion of the mercaptans in the mercaptan-containing hydrocarbon stream may be oxidized to disulfides. The disulfides are generally caustic, insoluble and remain in the hydrocarbon phase. The MEROX effluent may be treated downstream of the MEROX reactor to remove undesirable by-products due to side reactions such as the neutralization of $H_2S$, oxidation of phenolic compounds, entrained caustic, etc., to produce a disulfide oil effluent. In MEROX processes for mercaptan-containing streams comprising a combination of gases and liquids, the MEROX process may include extraction of the mercaptans. Extraction may be applied to both gaseous and liquid hydrocarbon streams. The degree of completeness of mercaptans extraction depends upon the solubility of mercaptans in the alkaline solution. The mercaptans removal may be a function of molecular weight of mercaptans, degree of branching of the mercaptan molecules, caustic soda concentration, and temperature of the system.

Referring again to FIG. 1, the MEROX unit 140 may include a MEROX reactor 142 and a MEROX effluent treatment system 150 disposed downstream of the MEROX reactor 142. The MEROX reactor 142 may be a fixed bed reactor or a multi-stage extraction reactor, both of which may include a mercaptan oxidation catalyst. The MEROX reactor 142 may be operable to receive a mercaptan-containing hydrocarbon stream 141 and contact the mercaptan-containing hydrocarbon stream with an oxygen-containing stream 144 in the presence of the mercaptan oxidation catalyst 146 and an alkaline solution 147, where the contacting causes at least a portion of the mercaptans in the mercaptan-containing hydrocarbon stream 141 to undergo oxidation to produce disulfides. The oxygen-containing stream 144 may be air, oxygen, or other gas stream comprising oxygen. The oxygen-containing stream 144 may be combined with the mercaptan-containing hydrocarbon stream 141 upstream of the MEROX reactor 142.

When the MEROX reactor 142 is a fixed bed reactor, the MEROX reactor 142 may include a MEROX catalyst comprising a MEROX reagent impregnated onto the surfaces of an activated charcoal support. Although depicted in FIG. 1 as a fixed bed reactor, the MEROX reactor 142 may alternatively be a multi-stage extraction reactor, which may be more suitable for processing a mercaptan-containing hydrocarbon stream 141 comprising a combination of gases and liquids. When the MEROX reactor 142 is a multi-stage extraction reactor, the MEROX catalyst 146 may be a liquid catalyst introduced to the MEROX reactor 142 along with the mercaptan-containing hydrocarbon stream 141, oxygen-containing gas 144, and alkaline solution 147. The alkaline solution 147 may be a solution of sodium hydroxide (NaOH) or ammonia ($NH_4$) in water. Contact of the mercaptan-containing hydrocarbon stream 141 with the oxygen-containing gas 144 in the presence of the MEROX catalyst 146 and alkaline solution 147 may cause at least a portion of the mercaptans from the mercaptan-containing hydrocarbon stream 141 to oxidize disulfides to produce a MEROX effluent 148 comprising disulfides.

As previously discussed, the MEROX unit 140 may include the MEROX effluent treatment system 150 disposed downstream of the MEROX reactor 142. The MEROX effluent treatment system 150 may be in fluid communication with the MEROX reactor 142 so that the MEROX effluent 148 may be passed directly from the MEROX reactor 142 to the MEROX effluent treatment system 150. The MEROX effluent treatment system 150 may be operable to process the MEROX effluent 148 to produce at least a disulfide oil effluent 152. The MEROX effluent treatment system 150 may include one or more unit operations for producing the disulfide oil effluent 152 from the MEROX effluent 148. The MEROX effluent treatment system 150 may include one or more separation units for separating the disulfide oil effluent 152 from the MEROX effluent 148. The MEROX process may produce various byproducts, such as hydrogen sulfide gas or other byproducts, through one or more side reactions in the MEROX reactor 142. Thus, the MEROX effluent treatment system 150 may also include one or more treatment units operable to remove one or more byproducts from the MEROX effluent 148, disulfide oil effluent 152, or both.

The disulfide oil effluent 152 from the MEROX unit 140 may include various disulfides, such as but not limited to dimethyl disulfide (DMDS), diethyl disulfide (DEDS), methylethyl disulfide (MEDS), other sulfides and disulfides, or combinations of these. Sulfides and trisulfides may also be present in the disulfide oil effluent 152. The disulfide oil effluent 152 may include at least 90%, at least 95%, at least 98%, or even at least 99% of the disulfide compounds produced in the MEROX unit 140. The disulfide oil effluent 152 may include at least 70 wt. %, at least 90 wt. %, at least 95 wt. %, at least 98 wt. %, or even at least 99 wt. % disulfide compounds based on the total weight of the disulfide oil.

A MEROX unit 140 designed for treating a propane and butane stream containing mercaptans may produce a disulfide oil effluent 152 having the composition in the following Table 1. The relative concentrations of the disulfides of the disulfide oil effluent 152 in Table 1 were derived from semi-quantitative GC-MS data. The quantitative total sulfur content of the disulfide oil effluent 152 provided in Table 1 was determined by energy dispersive x-ray fluorescence spectroscopy to be 63 wt. % based on the total weight of the disulfide oil effluent 152. GC-MS provides evidence for trace quantities of tri-sulfide species, however, the vast majority of the disulfide oil effluent 152 produced from a MEROX process conducted on a hydrocarbon feed comprising butane and propane comprises the disulfide compounds in Table 1. However, the disulfide oil effluent 152 may have any combination or concentrations of disulfides depending on the mercaptans present in the feed, and the composition in Table 1 is just one example of such a composition.

TABLE 1

Constituents of an Exemplary Disulfide Oil

| Constituent of Disulfide Oil | Amount (wt. %) | Boiling Temp (° C.) | Molecular Weight (Daltons) | Sulfur Content (wt. %) |
|---|---|---|---|---|
| Di-Methyl Di-Sulfide | 15.7 | 110 | 94 | 68.1 |
| Di-Ethyl Di-Sulfide | 33.4 | 152 | 122 | 52.5 |
| Methyl Ethyl Di-Sulfide | 49.3 | 121 | 108 | 59.3 |
| Total | 98.4 | — | — | — |
| Average | — | 128 | 109 | 57 |

The disulfide oil produced from a MEROX unit 140 can be processed or disposed of in various unit operations within a refinery. For example, the disulfide oil can be added to fuel oil pool at the expense of higher sulfur content of the fuel oil pool. In some cases, the disulfide oil can be processed in a hydrotreating or hydrocracking unit; however, processing the disulfide oil in a hydrotreating or hydrocracking unit may require greater hydrogen consumption, which can increase the cost of operating the hydrotreating or hydrocracking processes. The disulfide oil can also have an undesirable odor, and there are problems in handling the disulfide oil. Thus, there is a need to improve the properties of the disulfide oil effluent 152 from the MEROX unit 140 and improve the effective utilization of the disulfide oil effluent 152 within a refinery.

The inventors of the present disclosure have discovered that the disulfide oil effluent 152 produced by the MEROX unit 140 possesses a high solubility factor compared with the straight run petroleum fractions and some mono-aromatic solvents. The greater solubility factor of the disulfide oil effluent 152 may enable the disulfide oil effluent 152 to be used to dissolve and solubilize PNA compounds and HPNA compounds. Thus, the inventors of the present disclosure discovered that the disulfide oil effluent 152 from a MEROX unit 140 can be an effective solvent for desorbing PNA compounds and HPNA compounds from the adsorbents 126 in the adsorption unit 120 for removing the PNA and HPNA compounds from a hydrocarbon stream, such as the hydrocarbon feed 102, recycle stream 104, or both.

The Hildebrand solubility scale (Joel H. Hildebrand, Journal of Paint Technology, Vol. 39, No. 505, February 1967) is one of the oldest and widely accepted scales used in the industry to scale the solvents. The Hildebrand solubility parameter is derived from the cohesive energy density of the solvent, which in turn is derived from the heat of vaporization. The basic theory behind the Hildebrand solubility parameter will now be briefly described. When a liquid is heated to its boiling point, energy is added to the liquid, resulting in an increase in the temperature of the liquid. Once the liquid reaches its boiling point, however, the further addition of heat does not cause a further increase in temperature. The energy that is added is entirely used to separate the molecules of the liquid and boil them away into a gas. If the amount of energy (in calories) was added from the onset of boiling to the point when all the liquid has boiled away is measured, the amount of energy required can provide a direct indication of the amount of energy required to separate the liquid into a gas, and thus the amount of van der Waals forces that held the molecules of the liquid together. The amount of heat that has to be added to separate the molecules may be independent of the boiling point temperature. A liquid with a low boiling point temperature may require considerable energy to vaporize, while a liquid with a higher boiling point temperature may vaporize quite readily, or vice versa. The energy required to vaporize the liquid is called the heat of vaporization. From the heat of vaporization, in calories per cubic centimeter of liquid, we can derive the cohesive energy density by Equation 1 (EQU. 1).

$$c = \frac{(\Delta H - R \times T)}{V_m} \quad \text{EQU. 1}$$

In EQU. 1, c is the cohesive energy density, $\Delta H$ is the heat of vaporization, R is the gas constant, T is the temperature, and $V_m$ is the molar volume. Joel H. Hildebrand proposed the solubility parameter as the square root of the cohesive energy density as a numerical value indicating the solvency behavior of a specific solvent. The equation for the Hildebrand solubility parameter is provided in Equation 2 (EQU. 2).

$$\delta = \left(\frac{(\Delta H - R \times T)}{V_m}\right)^{1/2} \quad \text{EQU. 2}$$

In EQU. 2, $\delta$ is the Hildebrand solubility parameter, which may be in units of calories$^{1/2}$ when metric units are used in EQU. 2 or in megapascal$^{1/2}$ (MPa$^{1/2}$) when SI units are used in EQU. 2.

Since the Hildebrand solubility parameters are not readily available in the literature for various refinery streams, the inventors of the present disclosure calculated the solubility parameters for the kerosene, light gas oil, aromatic bottom streams from an aromatics recovery complex, and the disulfide oil effluent 152 from a MEROX unit 140 as shown in Table 2. Table 2 also includes typical Hildebrand solubility parameters for common individual solvents.

TABLE 2

Hildebrand Solubility Parameters ($\delta$) for Selected Solvents, Refinery Streams, and Disulfide Oil

| Solvent | $\delta$ (MPa$^{1/2}$) |
|---|---|
| Heptane | 15.3 |
| n-Dodecane | 16.0 |
| Benzene | 18.7 |
| Kerosene* | 16.3 |
| Light gas oil* | 15.7 |
| Aromatic Bottoms Stream (full range)** | 20.7 |
| Aromatic Bottoms Stream (bp ≥ 180° C.)** | 21.2 |
| Disulfide Oil Effluent (from Table 1) | 19.6 |

*$\delta$ calculated from EQU. 2 using known or measured properties
**$\delta$ estimated using EQU. 2 based on estimated properties As shown in Table 2, heptane, a paraffinic solvent with a carbon number of 7, has a Hildebrand solubility parameter ($\delta$) of 15.3 MPa$^{1/2}$, and n-dodecane, a paraffinic solvent with carbon number of 12, has a $\delta$ value of 16 MPa$^{1/2}$. Benzene, a mono-aromatic solvent with a carbon number of 6, has a $\delta$ value of 18.7 MPa$^{1/2}$. The $\delta$ of 16.3 MPa$^{1/2}$ for kerosene is indicative of kerosene having both paraffinic and aromatic components. Light gas oil has a $\delta$ less than kerosene, which indicates that the light gas oil may be more paraffinic in nature compared with the kerosene fraction, based on the comparison of $\delta$. The aromatics bottoms stream, whether its full range stream as received from an aromatics recovery complex, or the fraction of the aromatic bottoms stream boiling at or above 180° C., exhibits high estimated $\delta$ in the range 20.7-21.7 MPa$^{1/2}$. The disulfide oil effluent 152 can exhibit an estimated $\delta$ value of 19.6 MPa$^{1/2}$, which is less than the aromatic bottoms stream, but significantly greater than the $\delta$ of benzene. Based on the estimated $\delta$ values for the disulfide oil effluent 152 from the MEROX unit 140, the inventors of the present disclosure found that the disulfide oil effluent 152 from the MEROX unit 140 can be a powerful solvent to solubilize PNA and HPNA compounds. The disulfide oil effluent 152 from the MEROX unit 140 may also exhibit good blending properties to maintain the PNA and HPNA compounds in solution.

As shown in EQU. 2, the Hildebrand Solubility Parameter ($\delta$) of a material may vary based on the enthalpy, molecular weight, and density ($V_m$=MW/density) of the material. Due to the similarities in the disulfide compounds present in the disulfide oil effluent 152, variability in the composition of the disulfide oil effluent 152 from the MEROX unit 140 is expected to have only a minimal effect on the $\delta$ value of the disulfide oil effluent 152.

The disulfide oil effluent 152 from the MEROX unit 140 may be used as at least a portion of the solvent 154 for regenerating the adsorbents 126 in the adsorption unit 120. Referring again to FIG. 1, the MEROX unit 140 may be in fluid communication with the adsorption unit 120 so that at least a portion of the disulfide oil effluent 152 may be passed from the MEROX unit 140 to the adsorption unit 120 during regeneration of the adsorbents 126. During regeneration of the adsorbents 126, the disulfide oil effluent 152 may be passed to at least one of the adsorption zones of the adsorption unit 120 as at least a portion of or all of the solvent 154 for regenerating the adsorbents 126.

In embodiments, the solvent 154 for regenerating the adsorbent 126 may include only the disulfide oil effluent 152 from the MEROX unit 140. In other embodiments, the solvent 154 may include one or more secondary solvents 162. Secondary solvents 162 may include but are not limited to benzene, toluene, xylenes, tetrahydrofuran (THF), a heavy naphtha stream having a boiling point temperature range of from 70-140° C., or combinations of these. The heavy naphtha stream having a boiling point temperature range of from 70-140° C. may be from any refinery process. The solvent 154 may include greater than or equal to 50 wt. %, greater than or equal to 60 wt. %, greater than or equal to 70 wt. %, or even greater than or equal to 80 wt. % disulfide oil based on the total weight of the solvent 154.

The secondary solvents 162 may be combined with a portion of the disulfide oil effluent 152 upstream of the adsorption unit 120 to produce the solvent 154 for regenerating the adsorbents 126. The adsorption system 100 may include a solvent blending unit 160 for combining the disulfide oil effluent 152 with the secondary solvents 162. The solvent blending unit 160 may be in fluid communication with the MEROX unit 140 so that at least a portion of the disulfide oil effluent 152 can be passed directly from the MEROX unit 140 to the solvent blending unit 160. The disulfide oil effluent 152 may be combined with the one or more secondary solvents 162 in the solvent blending unit 160 to produce the solvent 154 for regenerating the adsorbent 126. The solvent blending unit 160 may be in fluid communication with the adsorption unit 120 so that the solvent 154 for regenerating the adsorbent 126 can be passed directly from the solvent blending unit 160 to the adsorption unit 120. The solvent 154 may also include recycle solvent 182 recovered after regeneration of the adsorbent 126, as will be further described in this disclosure.

During regeneration of adsorbents 126 on the adsorption unit 120, the solvent 154 containing at least a portion of the disulfide oil effluent 152 may be contacted with the adsorbent 126 in the adsorption zone being regenerated. As previously discussed, the adsorption unit 120 may be operated in swing mode so that adsorption of PNA and HPNA compounds from the hydrocarbon stream proceeds continuously while at least one adsorption zone is regenerated. Contact of the solvent 154 with the at least partially saturated adsorbent 126 may cause at least a portion of PNA compounds, HPNA compounds, or both to desorb from the adsorbent 126 to the solvent 154. The greater solubility of the disulfide oil effluent 152 of the solvent 154 may increase the amount of PNA compounds, HPNA compounds, or both desorbed from the adsorbent 126 during regeneration or may reduce the amount of solvent 154 used to regenerate the adsorbents 126 to an acceptable level. The use of the disulfide oil effluent 152 in the solvent 154 for regenerating the adsorbents 126 in the adsorption unit 120 may also provide a beneficial use for the disulfide oil effluent 152 from the MEROX unit 140 instead of directing the disulfide oil effluent 152 to other processing or disposal methods. Using disulfide oil in the solvent 154 may also reduce the costs of operating the adsorption unit 120 by reducing the costs of the regenerating solvents, such as benzene, toluene, or xylenes, which are valuable intermediates having more valuable uses in other refinery processes or as commodity chemicals. Contact of the adsorbents 126 with the solvent 154 may further desorb other contaminants, such as sulfur-containing compounds and nitrogen-containing compounds, from the adsorbent 126.

A desorption effluent 170 may be passed out of the adsorption unit 120 following contact of the solvent 154 with the adsorbents 126. The desorption effluent 170 may include at least the solvent 154 and the desorbed PNA compounds, HPNA compounds, or both. The desorption effluent 170 may be passed to a desorption separation system 180. The desorption separation system 180 may be in fluid communication with an outlet of the adsorption unit 120 so that the desorption effluent 170 can be passed directly from the adsorption unit 120 to the desorption separation system 180. The desorption separation system 180 may be operable to separate the desorption effluent 170 into a recycle solvent 182 and a desorption bottom stream 184. The desorption separation system 180 may include one or a plurality of separation units operable to separate the desorption effluent 170 into the recycle solvent 182 and the desorption bottom stream 184. In embodiments, the desorption separation system 180 may include a fractionator operable to separate the recycle solvent 182 from the desorption bottoms 184 through differences in boiling point temperature.

The recycle solvent 182 may include the disulfide oil and the secondary solvents from the desorption effluent 170. The recycle solvent 182 may include at least 80%, at least 90%, at least 95%, at least 98%, or at least 99% of the disulfide oil from the desorption effluent 170. The recycle solvent 182 may include at least 80%, at least 90%, at least 95%, at least 98%, or at least 99% of the secondary solvents from the desorption effluent 170. The recycle solvent 182 may have less than 0.1 wt. %, less than 0.01 wt. %, or even less than 0.005 wt. % PNA compounds, HPNA compounds, or both based on the total mass flow rate of the recycle solvent 182. The recycle solvent 182 may be passed back to the adsorption unit 120 to be used in further regeneration of the adsorbents 126. A recycle solvent outlet of the desorption separation system 180 may be in fluid communication with an inlet of the adsorption unit 120 so that the recycle solvent 182 can be passed back to the adsorption unit 120 for further regeneration of the adsorbents 126. In embodiments, the recycle solvent outlet of the desorption separation system 180 may be in fluid communication with the solvent blending unit 160 to pass the recycle solvent 182 directly to the solvent blending unit 160, in which the recycle solvent 182 may be combined with a portion of the disulfide oil effluent 152 from the MEROX unit 140 and, optionally, one or more fresh secondary solvents 162 to produce the solvent 154 for regenerating the adsorbents 126.

The desorption bottoms stream 184 from the desorption separation system 180 may include the nitrogen-containing compounds, sulfur-containing compounds, PNA compounds, HPNA compounds, or combinations of these from the desorption effluent 170. The desorption bottoms stream 184 may include at least 95%, at least 98%, or at least 99% of the PNA compounds and HPNA compounds from the desorption effluent 170. The desorption bottom stream 184 may be passed out of a bottoms outlet of the desorption separation system 180. The desorption bottom stream 184 may be passed to one or more downstream refinery operations for further processing. In embodiments, the desorption bottom stream 184 may be passed to a residue upgrading process for converting the PNA compounds, HPNA compounds, or both to greater value petrochemical products or intermediates. In embodiments, the desorption bottom stream 184 may be passed to a fuel oil blending process to be used as a constituent of a fuel oil. Other refinery processes for recovering or converting the PNA and HPNA compounds from the desorption bottom stream 184 are contemplated.

Referring again to FIG. 1, processes for treating a hydrocarbon stream to remove PNA compounds, HPNA compounds, or both may include contacting the hydrocarbon stream with the adsorbent 126 in the adsorption unit 120. The contacting may cause at least a portion of the PNA compounds, the HPNA compounds, or both in the hydrocarbon stream to be adsorbed onto the adsorbent 126 to produce a treated hydrocarbon stream 130. The processes may include regenerating the adsorbent 126 in at least one adsorption zone of the adsorption unit 120. Regenerating the adsorbent 126 may include ceasing contact of the hydrocarbon stream with the adsorbent 126 in the adsorption zone and contacting the adsorbent 126 with the solvent 154 comprising the disulfide oil. Contacting the adsorbent 126 with the solvent 154 comprising the disulfide oil may desorb at least a portion of the PNA compounds, the HPNA compounds, or both from the adsorbent 126 into the solvent 154 to produce the desorption effluent 170 comprising the at least a portion of the PNA compounds, the HPNA compounds, or both desorbed from the adsorbent 126. Before contacting the adsorbents 126 with the solvent 154 comprising at least the disulfide oil, regenerating the adsorbents 126 may include contacting the adsorbents with a paraffinic solvent, where contacting desorbs non-PNA and non-HPNA hydrocarbons from pores, void spaces, or both of the adsorbent. Regenerating may further include passing an inert gas through the adsorbents 126 to dry the adsorbents 126 before contacting with the solvent 154 comprising the disulfide oil.

At least a portion of the hydrocarbon stream may include the hydrocarbon feed 102 for a hydrocracking process, where the hydrocarbon feed 102 may include at least PNA compounds. The hydrocarbon feed 102 may also include HPNA compounds. At least a portion of the hydrocarbon stream may also include a recycle stream 104, such as but not limited to a hydrocracker bottom stream, where the recycle stream 104 may include PNA compounds, HPNA compounds, or both. The desorption effluent 170 may include at least a portion of the PNA compounds, the HPNA compounds or combinations of these from the recycle stream 104.

The solvent 154 may include the disulfide oil as a primary solvent. In any of the processes, the solvent 154 may consist or consist essentially of disulfide oil. Any of the processes may further include combining the disulfide oil with at least one secondary solvent 162 upstream of the adsorption unit 120 to produce the solvent 154 and then passing the solvent 154 to the adsorption unit 120 during regeneration of the adsorbent 126. In any of the processes, the solvent 154 may comprise the disulfide oil as a primary solvent and at least one secondary solvent 162. The secondary solvent 162 may be selected from the group consisting of benzene, toluene, xylene, tetrahydrofuran, a heavy naphtha stream having a boiling point temperature range of from 70° C. to 140° C., or combinations of these. The disulfide oil may be at least a portion of the disulfide oil effluent 152 from a MEROX unit 140.

Any of the processes may further include contacting the mercaptan-containing hydrocarbon stream 141 with an oxygen-containing gas 144 and an alkaline solution 147 in the presence of a mercaptan oxidation catalyst 146. The contacting may cause at least a portion of the mercaptan in the mercaptan-containing hydrocarbon stream 141 to react to produce a mercaptan oxidation effluent 148 comprising at least the disulfide oil. The processes may further include treating the mercaptan oxidation effluent 148 to produce at least the disulfide oil effluent 152 comprising at least a portion of the disulfide oil and passing at least a portion of the disulfide oil effluent 152 to the adsorption unit 120 as at least a portion of the solvent 154 for regeneration of the adsorbent 126.

Any of the processes of the present disclosure may further include recovering the PNA compounds, the HPNA compounds, or both from the desorption effluent 170. Any of the processes may include passing the desorption effluent 170 to a desorption separation system 180 that may separate the desorption effluent 170 into the recycle solvent 182 comprising at least disulfide oil and the desorption bottom stream 184 comprising the majority portion of the PNA compounds, the HPNA compounds, or both from the desorption effluent 170. The processes may further include passing at least a portion of the recycle solvent 182 from the desorption separation system 180 to the adsorption unit 120 for further regeneration of the adsorbents 126. The processes may further include combining at least a portion of the recycle solvent 182 with the solvent 154 upstream of the adsorption unit 120.

Referring now to FIG. 2, the adsorption system 100 may be integrated into a hydrocracking system 200 for upgrading a hydrocarbon feed 102 to one or more greater-value fuels, petrochemical products, or petrochemical intermediates through hydrocracking. The hydrocracking system 200 may include a hydrocracking unit 210, a hydrocracker effluent separation system 240 downstream of the hydrocracking unit 210, and the adsorption system 100 positioned upstream of the hydrocracking unit 210. The adsorption system 100 may include the adsorption unit 120 and the MEROX unit 140 upstream of the adsorption unit 120. The hydrocarbon feed 102 to the hydrocracking system 200 may be introduced to the adsorption unit 120 of the adsorption system 100 to remove PNA compounds, HPNA compounds, or both from the hydrocarbon feed 102 to produce the treated hydrocarbon stream 130. The treated hydrocarbon stream 130 may be passed to the hydrocracking unit 210 for upgrading the treated hydrocarbon stream 130 to produce one or more greater-value petrochemical products or chemical intermediates through hydrocracking. The adsorption system 100 may remove PNA compounds, HPNA compounds, or both from the hydrocarbon feed 102, a hydrocracker bottom stream 246, or both to reduce or prevent formation and buildup of HPNA compounds in the hydrocracking system 200 and downstream process equipment, such as heat exchangers, separators, and the like.

The hydrocarbon feed 102 may include one or more oil sources, such as vacuum gas oils, demetallized oil (DMO), deasphalted oil (DAO), coker gas oils, cycle oils, visbreaker oils, pyrolysis fuel oil, coal liquids, bio-derived heavy oils, or combinations of these. The hydrocarbon feed 102 may comprise a raw oil source, such as crude oil that has not been previously processed, an oil source that has undergone some degree of processing prior to being introduced to the hydrocracking system 200 as the hydrocarbon feed 102, or both. The hydrocarbon feed 102 may have a density of from 0.8500 grams per milliliter (g/mL) to 0.9900 g/mL, a hydrogen content of from 8 wt. % to 15 wt. % based on the total weight of the hydrocarbon feed 102, a sulfur content of from 0.25 wt. % to 5.00 wt. % based on the total weight of the hydrocarbon feed 102, a nitrogen content of from 100 ppmw to 3000 ppmw, and a boiling point range from 180° C. to 1000° C., from 450° C. to 800° C., or from 500° C. to 700° C. In embodiments, the hydrocarbon feed 102 may include a vacuum gas oil, which may contain hydrocarbons having boiling point temperatures of from 350° C. to 600° C., or from 350° C. to 570° C. The hydrocarbon feed 102 may include one or more PNA compounds. The hydrocarbon feed 102 may have a concentration of PNA compounds of from 10 ppmw to 104,000 ppmw.

One example of a hydrocarbon feed 102 suitable for introducing to the hydrocracking system 200 is provided below in Table 3. The example hydrocarbon feed is a blend of a vacuum gas oil and a demetallized oil that was derived from a vacuum residue through a solvent deasphalting process using a paraffinic solvent, although it is understood that the hydrocarbon feed 102 may not be limited to this particular material.

TABLE 3

| Vacuum Gas Oil/Demetallized Oil Blend | | | |
|---|---|---|---|
| Analysis | Units | Value | Test Method |
| Density | g/mL | 0.9124 | ASTM D287 |
| Hydrogen Content | wt. % | 12.15 | ASTM D5292 |
| Sulfur Content | wt. % | 2.100 | ASTM D5453 |
| Nitrogen Content | ppmw | 815.0 | ASTM D4629 |
| Boiling Point Distribution | | | |
| Initial Boiling Point (IBP) | ° C. | 216 | ASTM D7169 |
| 10% Boiling Point (BP) | ° C. | 344 | ASTM D7169 |

TABLE 3-continued

Vacuum Gas Oil/Demetallized Oil Blend

| Analysis | Units | Value | Test Method |
|---|---|---|---|
| 30% BP | °C. | 409 | ASTM D7169 |
| 50% BP | °C. | 449 | ASTM D7169 |
| 70% BP | °C. | 495 | ASTM D7169 |
| 90% BP | °C. | 580 | ASTM D7169 |
| 95% BP | °C. | 635 | ASTM D7169 |
| Final Boiling Point (FBP) | °C. | 730 | ASTM D7169 |

The hydrocarbon feed 102 may include PNA compounds. The hydrocarbon feed 102 may be passed to the adsorption unit 120 for treatment to remove the PNA compounds. The hydrocarbon feed 102 may be passed directly to the adsorption unit 120 or may be combined with one or more recycle streams, such as the hydrocracker bottom stream 246, upstream of the adsorption unit 120.

Referring again to FIG. 2, the adsorption system 100 may be disposed upstream of the hydrocracking unit 210. The adsorption system 100 may have any of the features for the adsorption system 100 previously described in relation to FIG. 1. Operation of the adsorption system 100 to remove PNA compounds, HPNA compounds, or both from the hydrocarbon feed 102 and to regenerate the adsorbents 126 in the adsorption unit 120 using the solvent 154 containing at least a portion of the disulfide oil effluent 152 from the MEROX unit 140 is the same as previously described in relation to FIG. 1, when the adsorption system 100 is integrated into the hydrocracking system 200. The adsorption system 100 may include the adsorption unit 120 comprising one or a plurality of adsorption zones, such as at least the first adsorption zone 122 and the second adsorption zone 124. Each of the adsorption zones may include the adsorbent 126 capable of adsorbing PNA compounds, HPNA compounds, or both from the hydrocarbon feed 102, hydrocracker bottom stream 246, or both. Operation of the adsorption unit to remove PNA compounds, HPNA compounds, or both from the hydrocarbon feed 102 and hydrocracker bottom stream 246 to produce the treated hydrocarbon stream 130 was previously described in relation to FIG. 1, and will not be repeated here. The adsorption unit 120 may produce a treated hydrocarbon stream 130 having a reduced concentration of PNA compounds, HPNA compounds, or both compared to the hydrocarbon feed 102, the hydrocracker bottom stream 246, or both.

As previously described, the adsorption system 100 may further include the MEROX unit 140 disposed upstream of the adsorption unit 120. As previously discussed, the MEROX unit 140 may be operable to convert mercaptans in the mercaptan-containing hydrocarbon stream 141 to disulfide oil and separate the disulfide oil from the MEROX effluent 148 (FIG. 1) to produce the disulfide oil effluent 152. The disulfide oil effluent 152 may be used as at least a portion of or all of the solvent 154 for regenerating the adsorbent 126 in the adsorption unit 120 to recover the PNA compounds, HPNA compounds, or both. Regeneration of the adsorbent 126 in the adsorption unit 120 using the solvent 154 comprising the disulfide oil effluent 152 from the MEROX unit 140 was previously described in relation to FIG. 1, and will not be repeated here.

Referring to FIG. 3, the disulfide oil effluent 152 may be combined with one or more secondary solvents 162 to produce the solvent 154, which may then be passed to the adsorption unit 120 for regeneration of the adsorbents 126. The disulfide oil effluent 152 may be combined with the secondary solvents 162 in the solvent blending unit 160 disposed between the MEROX unit 140 and the adsorption unit 120. The desorption effluent 170 may be separated in the desorption separation system 180 to produce the recycle solvent 182, which may be passed back to the adsorption unit 120 or to the solvent blending unit 160 upstream of the adsorption unit 120. The solvent blending unit 160 and the desorption separation system 180, as well as operation of these units, were previously described in relation to FIG. 1. Operation of these units is the same as previously described when the adsorption system 100 is integrated into the hydrocracking system 200.

Referring again to FIG. 2, the hydrocracking unit 210 may be disposed downstream of adsorption unit 120. The hydrocracking unit 210 may be in fluid communication with an outlet of the adsorption unit so that the treated hydrocarbon stream 130 can be passed directly from the adsorption unit 120 to the hydrocracking unit 210. The treated hydrocarbon stream 130 may be passed through one or more heat exchange units (not shown) upstream of the hydrocracking unit 130 to increase the temperature of the treated hydrocarbon stream 130 to the hydrocracking temperature in the hydrocracking unit 210. The treated hydrocarbon stream 130 may be introduced directly to the hydrocracking unit 210 or may be combined with hydrogen upstream of the hydrocracking unit 210. The hydrogen may comprise a hydrogen feed 214 from an external hydrogen source (not depicted), recycle hydrogen 282 recovered from the hydrocracker effluent separation system 240, or both. The hydrogen may be introduced directly to the hydrocracking unit 210 or may be combined with the treated hydrocarbon stream 130 upstream of the hydrocracking unit 210.

The hydrocracking unit 210 may be operable to contact the treated hydrocarbon stream 130 with the hydrogen in the presence of at least one hydrocracking catalyst 212 at reaction conditions sufficient to cause at least a portion of the hydrocarbons in the treated hydrocarbon stream 130 to undergo hydrocracking to produce a hydrocracker effluent 216. The hydrocracking unit 210 may be any type of hydrocracking unit operable to hydrocrack the treated hydrocarbon stream 130. The hydrocracking unit 210 may include one or a plurality of hydrocracking reactors that may be operable to contact the treated hydrocarbon stream 130 with the hydrogen in the presence of the hydrocracking catalyst 212 at reaction conditions sufficient to cause at least a portion of the hydrocarbons in the treated hydrocarbon stream 130 to undergo hydrocracking reactions to produce the hydrocracker effluent 216. Suitable reactors may include fixed bed reactors, moving bed reactors, ebullated bed reactors, plug flow reactors, or combinations of reactors, such as two or more fixed bed reactors arranged in series. For example, the first hydrocracking unit 110 may comprise one or more fixed bed reactors, which may be operated in downflow, upflow, or horizontal flow configurations.

There are three general processes for hydrocracking: single-stage once-through hydrocracking, series-flow hydrocracking, and two-stage recycle hydrocracking. Both single-stage once-through hydrocracking and series-flow hydrocracking typically comprise passing a hydrocarbon feed through one or more hydrocracking units, arranged in series. Single-stage once-through hydrocracking typically only comprises the passing of the hydrocarbon feed through the hydrocracking system a single time, and series-flow hydrocracking typically comprises passing the entire hydrocracked effluent from one hydrocracking unit to the next. Two-stage recycle hydrocracking typically comprises passing a hydrocarbon feed through at least two hydrocracking units, where only the fraction with the greatest atmospheric boiling point of the effluent from the first hydrocracking unit is passed to the second hydrocracking unit. Since the first hydrocracking unit typically accomplishes both hydrotreating and hydrocracking to some degree, the feed passed to the second hydrocracking unit is virtually free of impurities, which allows for the use of catalysts with greater functionality in the second hydrocracking unit. For the sake of simplicity, the hydrocracking system 200 is depicted in FIGS. 2 and 3 as a single-stage hydrocracking process with recycling of the hydrocracker bottom stream 246 back to the adsorption unit 120 and back through the hydrocracking unit 210. However, it is understood that the adsorption system 100 may be integrated into other hydrocracking systems, such as series-flow hydrocracking systems or two-stage recycle hydrocracking systems without deviating from the scope of the present disclosure.

The hydrocracking catalyst 212 in the hydrocracking unit 210 may include one or more solid particulate catalysts capable of promoting or increasing the reaction rate of hydrotreating reactions, hydrocracking reactions, or both of hydrocarbons in contact with hydrogen. Suitable hydrocracking catalysts may comprise amorphous alumina catalysts, amorphous silica-alumina catalysts, titania catalysts, zeolite catalysts, or combinations of these. Suitable zeolite catalysts may comprise zeolites with framework type of FAU, MFI, BEA and MOR, Beta zeolites, mordenite zeolites, or combinations of these. Suitable hydrocracking catalysts may further comprise one or more active phase materials, such as one or more metals from Groups 6-10 of the International Union of Pure and Applied Chemistry Periodic Table of the Elements (IUPAC periodic table). Suitable active phase materials may comprise nickel, tungsten, molybdenum, cobalt, titanium, zirconium, or combinations of these. The one or more active phase materials may be supported on the catalyst or embedded within the catalyst. For example, the hydrocracking catalyst 212 in the hydrocracking unit 210 may comprise nickel and molybdenum supported on an amorphous silica-alumina catalyst. The hydrocracking catalyst 212 may be selected to preferentially promote or increase the reaction rate of hydrocracking reactions. The adsorption unit 120 may also remove nitrogen-containing compounds and sulfur-containing compounds from the hydrocarbon feed 102. Thus, hydrocracking catalysts that are not tolerant to such impurities, such as those comprising significant amounts of zeolite catalysts, may be used as the hydrocracking catalyst 212 in the hydrocracking unit 210.

Referring to FIG. 2, in operation of the hydrocracking system 200, the hydrocarbon feed 102 may be introduced to the adsorption unit 120, where the hydrocarbon feed 102 may be contacted with the adsorbents 126 in the adsorption unit 120. Contact with the adsorbents 126 may remove at least a portion of the PNA compounds, HPNA compounds, or both from the hydrocarbon feed 102 to produce a treated hydrocarbon stream 130. The treated hydrocarbon stream 130 may be passed to the hydrocracking unit 210, where the treated hydrocarbon stream 130 may be contacted with hydrogen in the presence of the hydrocracking catalyst 212.

The hydrocracking unit 210 may be operated at conditions sufficient to cause at least a portion of hydrocarbons in the treated hydrocarbon stream 130 to undergo hydrocracking reactions. The hydrocracking unit 210 may be operated at a hydrocracking temperature of from 300° C. to 500° C., from 300° C. to 475° C., from 300° C. to 450° C., from 330° C. to 500° C., from 330° C. to 475° C., or from 330° C. to 450° C. The hydrocracking unit 210 may be operated at a hydrogen partial pressure of from 60 kilograms per square centimeter ($kg/cm^2$) to 300 $kg/cm^2$, from 100 $kg/cm^2$ to 200 $Kg/cm^2$, or from 130 $Kg/cm^2$ to 180 $Kg/cm^2$. The hydrocracking unit 210 may be operated at a liquid hourly space velocity of from 0.1 $h^{-1}$ to 10 $h^{-1}$, from 0.25 $h^{-1}$ to 5 $h^{-1}$, or from 0.5 $h^{-1}$ to 2 $h^{-1}$. The hydrocracking unit 210 may be operated at a hydrogen to oil ratio of from 500 normalized cubic meters of hydrogen per cubic meter of oil ($Nm^3/m^3$) to 2500 $Nm^3/m^3$, from 800 $Nm^3/m^3$ to about 2000 $Nm^3/m^3$, or from 1000 $Nm^3/m^3$ to 1500 $Nm^3/m^3$.

Contact of the treated hydrocarbon stream 130 with hydrogen in the presence of the hydrocracking catalyst 212 at the hydrocracking conditions may cause at least a portion of the hydrocarbons in the treated hydrocarbon stream 130 to undergo hydrocracking reactions to produce a hydrocracking effluent 216 having one or more greater value petrochemical products or chemical intermediates. The hydrocracker effluent 216 may have a reduced concentration of HPNA compounds compared to a hydrocracker effluent from a hydrocracking system that does not include the adsorption system 100 upstream of the hydrocracking unit 210.

Referring again to FIGS. 2 and 3, the hydrocracker effluent 216 may be passed to the hydrocracker effluent separation system 240. The hydrocracking unit 210 may be in fluid communication with the hydrocracker effluent separation system 240 to pass the hydrocracker effluent 216 directly from the hydrocracking unit 210 to the hydrocracker effluent separation system 240 without passing through any intervening reactors or separation units. The hydrocracker effluent separation system 240 may be operable to separate the hydrocracker effluent 216 to produce at least one upgraded effluent 244 and the hydrocracker bottom stream 246. The hydrocracker effluent separation system 240 may also produce a light gas stream 242. The hydrocracker effluent separation system 240 may include one or a plurality of separation units, which, collectively, may be operable to separate the hydrocracker effluent 216 into at least a light gas stream 242, the at least one upgraded effluent 244, and the hydrocracker bottom stream 246.

The light gas stream 242 may include but is not limited to excess hydrogen from the hydrocracking unit 210, methane, hydrogen sulfide, ammonia, other light gases, or combinations of these. Light gases may refer to gases in the hydrocracker effluent 216 that are in gaseous form at ambient temperature and pressure, such as having boiling point temperatures less than 36° C. at atmospheric pressure. The light gas stream 242 may include greater than or equal to 95%, greater than or equal to 97%, or even greater than or equal to 99% of the light gases from the hydrocracker effluent 216. The light gas stream 242 may be passed to a gas treatment plant 280 for further processing, such as removal of hydrogen sulfide gas and ammonia and separation and purification of hydrogen. The gas treatment plant 280 may produce a recycle hydrogen 282 and one or more other gas streams 284. The recycle hydrogen 282 may be recycled back to the hydrocracking unit 210 as at least a portion of the hydrogen. The recycle hydrogen 282 may be combined with the hydrogen 214 upstream of the hydrocracking unit 210.

The upgraded effluent 244 may include hydrocarbon constituents having a boiling point temperature of from 36° C. to 540° C. The upgraded effluent 244 may include a lesser-boiling upgraded effluent and a greater-boiling upgraded effluent. The lesser-boiling upgraded effluent may include constituents of the hydrocracker effluent 216 having boiling point temperatures less than 370° C., such as from 36° C. to 370° C. The lesser-boiling upgraded effluent may include paraffinic compounds, such as alkanes having 2 to 20 carbon atoms (C2-C20 alkanes), and other hydrocarbons having boiling point temperatures less than 370° C., such as alkenes and alkynes with boiling temperatures less than 370° C. The upgraded effluent 244, in particular the lesser-boiling upgraded effluent portion of the upgraded effluent 244, may include greater than or equal to 95%, greater than or equal to 97%, or even greater than or equal to 98% of the C2-C10 alkanes from the hydrocracker effluent 216. The greater-boiling upgraded effluent portion of the upgraded effluent 244 may include constituents of the hydrocracker effluent 216 having boiling point temperatures of from 370° C. to 540° C. The upgraded effluent 244 may include greater than or equal to 95%, greater than or equal to 97%, greater than or equal to 99% of the constituents of the hydrocracker effluent 216 having boiling point temperatures of from 36° C. to 540° C.

The hydrocracker bottom stream 246 may include constituents of the hydrocracker effluent 216 having a boiling point temperature greater than or equal to 540° C., such as from 540° C. to 720° C. The hydrocracker bottom stream 246 may include at least 95%, at least 98%, or even at least 99% of the constituents of the hydrocracker effluent 216 having boiling point temperatures greater than 540° C. at atmospheric pressure. The hydrocracker bottom stream 246 may include any of the remaining unconverted PNA compounds from the treated hydrocarbon stream 130 passed through the hydrocracking unit 210, HPNA compounds formed in the hydrocracking unit 210, or both. In embodiments, the hydrocracker bottom stream 146 may have from 0 parts per million by weight (ppmw) to 104,000 ppmw, or from 1 ppmw to 100,000 ppmw HPNA compounds. All or at least a portion of the hydrocracker bottom stream 246 may be passed back to the adsorption unit 120 for removal of at least a portion of the PNA compounds, HPNA compounds, or both prior to recycling the portion of the hydrocracker bottom stream 246 back through the hydrocracking unit 210. The portion of the hydrocracker bottom stream 246 may be combined with the hydrocarbon feed 102 upstream of the adsorption unit 120 or may be passed directly and independently to the adsorption unit 120. Passing at least a portion of or all of the hydrocracker bottom stream 246 back to the adsorption unit 120 and through the hydrocracking unit 210 may increase the yield of greater-value petrochemical products or intermediates from the hydrocarbon feed 102 by further converting larger hydrocarbons remaining in the hydrocracker bottom stream 246 to smaller paraffinic hydrocarbons, which may be more suitable for downstream processing to produce olefins, aromatic compounds, fuel blending components, other petrochemical products or intermediates, or combinations of these.

Referring again to FIG. 2, in embodiments, the hydrocracker effluent separation system 240 may include at least a high-pressure separator 250 and a fractionator 254 disposed downstream of the high-pressure separator 250. The high-pressure separator 250 may be in fluid communication with the hydrocracking unit 210 so that the hydrocracker effluent 216 can be passed directly from the hydrocracking unit 210 to the high-pressure separator 250. The high-pressure separator 250 may be operable to separate the hydrocracker effluent 216 into the light gas stream 242 and a high-pressure separator liquid effluent 252. The light gas stream 242 may be passed to a gas treatment plant 280 and the high-pressure separator liquid effluent 252 may be passed on to the fractionator 254. The hydrocracked effluent separation system 240 may additionally include a low-pressure separator (not shown) downstream of the high-pressure separator 250 and disposed between the high-pressure separator 250 and the fractionator 254. The low-pressure separator may be operable to further separate gaseous constituents from the high-pressure separator liquid effluent 252. The fractionator 254 may be operable to separate the high-pressure separator liquid effluent 252 into the one or more upgraded effluent 244 and the hydrocracker bottom stream 246. In one or more embodiments, the fractionator 254 may include a fractional distillation column operable to separate the high-pressure separator liquid effluent 252 into a plurality of different effluent streams based on differences in boiling point temperatures. Although shown as producing a single upgraded effluent 244, the fractionator 254 may be operable to produce a plurality of upgraded effluents, such as a naphtha effluent having boiling point temperatures of from 36° C. to 180° C., a middle distillate effluent having boiling point temperatures from 180° C. to 370° C., and a greater boiling effluent having boiling point temperatures of from 370° C. to 540° C., for example. Other upgraded effluent streams are also contemplated.

Referring again to FIG. 2, processes for upgrading the hydrocarbon feed 102 with the hydrocracking process 200 of the present disclosure will now be described. The processes may include contacting the hydrocarbon feed 102 with the adsorbents 126 in the adsorption unit 120, where the contacting may cause at least a portion of PNA compounds, HPNA compounds, or both in the hydrocarbon feed 102 to be adsorbed onto the adsorbent 126 to produce the treated hydrocarbon stream 130. The adsorption unit 120 and adsorbents 126 may have any of the features, characteristics, or operating conditions previously described in the present disclosure for these components. The processes may further include contacting at least a portion of the treated hydrocarbon stream 130 with hydrogen in the presence of at least one hydrocracking catalyst 212 to produce the hydrocracker effluent 216 and separating the hydrocracker effluent 216 into the at least one upgraded effluent 244 and the hydrocracker bottom stream 246. The processes may further include regenerating the adsorbents 126 in the adsorption unit 126. Regenerating the adsorbents 126 may include contacting the adsorbents 126 with the solvent 154 that includes the disulfide oil, where contacting the adsorbent 126 with the solvent 154 comprising the disulfide oil desorbs at least a portion of the PNA compounds, HPNA compounds, or both from the adsorbents 126 into the solvent 154 to produce the desorption effluent 170. The desorption effluent 170 may include at least a portion of the PNA compounds, HPNA compounds, or both. The solvent 154 may have any of the compositions, properties, or characteristics previously described in the present disclosure for the solvent 154.

The processes for upgrading the hydrocarbon feed 102 with the hydrocracking process 200 of the present disclosure may include passing the hydrocarbon feed 102 to the adsorption unit 120 that contacts the hydrocarbon feed 102 with the adsorbents 126, where contact of the hydrocarbon feed 102 with the adsorbents 126 may cause at least a portion of PNA compounds, HPNA compounds, or both in the hydrocarbon feed 102 to be adsorbed onto the adsorbent 126 to produce the treated hydrocarbon stream 130. The adsorption unit 120 and adsorbents 126 may have any of the features, characteristics, or operating conditions previously described in the present disclosure for these components. The processes may further include passing at least a portion of the treated hydrocarbon stream 130 from the adsorption unit 120 to the hydrocracking unit 210, where the hydrocracking unit 210 may contact the at least a portion of the treated hydrocarbon stream 130 with hydrogen in the presence of the at least one hydrocracking catalyst 212 to produce the hydrocracker effluent 216. The hydrocracking unit 210 and hydrocracking catalyst 212 may have any of the features, compositions, or operating conditions previously described in the present disclosure for these components of the system 200. The processes may further include passing the hydrocracker effluent 216 to the hydrocracker effluent separation system 240, which may separate the hydrocracker effluent 216 into the at least one upgraded effluent 244 and the hydrocracker bottom stream 246. The processes may further include regenerating the adsorbents 126 in the adsorption unit 126. Regenerating the adsorbents 126 may include contacting the adsorbents 126 with the solvent 154 that includes the disulfide oil, where contacting the adsorbent 126 with the solvent 154 comprising the disulfide oil desorbs at least a portion of the PNA compounds, HPNA compounds, or both from the adsorbents 126 into the solvent 154 to produce the desorption effluent 170. The desorption effluent 170 may include at least a portion of the PNA compounds, HPNA compounds, or both. The solvent 154 may have any of the compositions, properties, or characteristics previously described in the present disclosure for the solvent 154.

The hydrocarbon feed 102 may have any of the compositions or properties previously discussed in the present disclosure. In any of the processes of the present disclosure, the hydrocarbon feed 102 may include a vacuum gas oil. The hydrocarbon feed 102 may also further include demetalized oil, deasphalted oil, or both.

In any of the disclosed processes, the disulfide oil in the solvent 154 may include at least a portion of the disulfide oil effluent 152 from the MEROX unit 140. The disulfide oil may have a Hildebrand solubility parameter of greater than or equal to 16 MPa$^{1/2}$, greater than or equal to 17 MPa$^{1/2}$, greater than or equal to 18 MPa$^{1/2}$, or even greater than or equal to 19 MPa$^{1/2}$. In any of the disclosed processes, the solvent 154 may include from 50 wt. % to 100 wt. % disulfide oil. The solvent 154 may include the disulfide oil and one or more secondary solvents 162 selected from the group consisting of benzene, toluene, xylenes, tetrahydrofuran, a heavy naphtha stream having a boiling point temperature range of from 70° C. to 140° C., or combinations of these. Any of the processes of the present disclosure may further include combining the disulfide oil with at least one secondary solvent 162 to produce the solvent 154. The processes may include passing the disulfide oil and the one or more secondary solvents 162 to a solvent blending unit 160 that combines the disulfide oil and the secondary solvents 162 to produce the solvent 154 and passing the solvent 154 to the adsorption unit 120 for regeneration of the adsorbents 126.

Referring now to FIG. 1, any of the processes may further include contacting the mercaptan-containing hydrocarbon stream 141 with the oxygen-containing gas 144 and the alkaline solution 147 in the presence of the mercaptan oxidation catalyst 146, where the contacting may cause at least a portion of the mercaptan in the mercaptan-containing hydrocarbon stream 141 to react to produce the mercaptan oxidation effluent 148 comprising at least the disulfide oil. The processes may further include treating the mercaptan oxidation effluent 148 to produce at least the disulfide oil effluent 152 comprising at least a portion of the disulfide oil and passing at least a portion of the disulfide oil effluent 152 to the adsorption unit 120 as at least a portion of the solvent 154 for regenerating the adsorbent 126. In embodiments, the processes may include passing the mercaptan-containing hydrocarbon stream 141 to the MEROX reactor 142 of the MEROX unit 140, where the MEROX reactor 142 contacts the mercaptan-containing hydrocarbon stream 141 with the oxygen-containing gas 144 and the alkaline solution 147 in the presence of the MEROX catalyst 146 to produce the MEROX effluent 148. The processes may include passing the MEROX effluent 148 to the MEROX effluent treatment system 150 that treats the MEROX effluent 148 to produce at least the disulfide oil effluent 152.

Any of the processes of the present disclosure may further include recovering at least a portion of the PNA compounds, HPNA compounds, or both from the desorption effluent 170. The processes may further include passing the desorption effluent 170 to the desorption separation system 180 that may separate the desorption effluent 170 into the recycle solvent 282, which may include at least disulfide oil, and the desorption bottom stream 184, which may include at least a portion of the PNA compounds, the HPNA compounds, or both from the desorption effluent 170. The desorption separation system 180 may include any of the features previously discussed for this unit. The processes may further include passing at least a portion of the recycle solvent 282 from the desorption separation system 180 to the adsorption unit 120 for further regeneration of the adsorbents 126. In embodiments, the processes may further include combining at least a portion of the recycle solvent 282 with the solvent 154 upstream of the adsorption unit 120. The processes may include passing the recycle solvent 282 to the solvent blending unit 160 that may combine the recycle solvent 282 with the portion of the disulfide oil effluent 152 from the MEROX unit 140 and, optionally, one or more secondary solvents 162, to produce the solvent 154 and then passing the solvent 154 to the adsorption unit 120.

Any of the processes of the present disclosure may further include passing at least a portion of the hydrocracker bottom stream 246 to the adsorption unit 120 and contacting the at least a portion of the hydrocracker bottom stream 246 with the adsorbents 126 in the adsorption unit 120, where the contacting causes at least a portion of PNA compounds, HPNA compounds, or both from the hydrocracker bottom stream 246 to adsorb onto the adsorbents 126.

In any of the processes of the present disclosure, the adsorbents may include at least one of activated carbon, Attapulgus clay, alumina, silica-alumina, titania, zeolites, silica, silica gel, spent catalysts, or combinations of these. The processes may further include adsorbing at least 90 percent, at least 95 percent, at least 98 percent, or even at least 99 percent by weight of the PNA compounds, HPNA compounds, or both from the hydrocarbon feed 102, the hydrocracker bottom stream 246, or both.

Examples

The various aspects of systems and processes of the present disclosure will be further clarified by the following examples. The examples are illustrative in nature and should not be understood to limit the subject matter of the present disclosure.

Disulfide oil from a MEROX unit was evaluated for desorption of HPNA compounds from an adsorbent used to treat a hydrocracker bottom stream from a hydrocracking unit to remove HPNA compounds from the hydrocracker bottom stream. First, 1000 grams (g) of a hydrocracker bottom stream containing 3804 parts per million by weight (ppmw) HPNA compounds was treated by passing the hydrocracker bottom stream through an adsorption column containing 10 g of activated carbon as the absorbent. The material balance and HPNA content of the hydrocracker bottom stream and treated hydrocarbon stream are shown in Table 4.

TABLE 4

| In-Out | Component | Quantity (g) | HPNA (ppmw) | HPNA (g) |
|---|---|---|---|---|
| In | Feedstream | 1000 | 3804 | 3.804 |
| In | Total in | 1000 | 3804 | 3.804 |
| Out | Treated feedstream | 995.8 | 1831 | 1.823 |
| Out | Pentane | 146.4 | 89 | 0.013 |
| Out | DSO | 142.5 | 1589 | 0.226 |
| Out | THF | 158.1 | 1057 | 0.056 |
| Out | DSO | 242.8 | 1825 | 0.057 |

After collecting the treated hydrocarbon stream, the column was washed with 5 grams pentane, followed by 150 grams of disulfide oil stream, then by 150 grams of tetrahydrofuran and then 250 grams of disulfide oil. The disulfide oil stream (DSO) was able to desorb 17 wt. % of the HPNA compounds from the adsorbents 126.

The disulfide oil (DSO) selectively desorbs the HPNA molecules from the adsorbent 126. Table 5 shows the concentration of particular HPNA compounds in the hydrocracker bottom stream used in the examples and the removal rate of these HPNA compounds when DSO is used as the solvent for regenerating the adsorbents. As seen in Table 5, DSO is effective at removing HPNA and PNA compounds from the adsorbent. The HPNA molecules with 6 fused benzene rings were removed at the highest rate.

TABLE 5

| HPNA Compound | Number of Fused Benzene Rings | HPNA adsorbed in column (g) | HPNA desorped by DSO* | Removal Rate (wt. %) |
|---|---|---|---|---|
| Benzoperylene | 6 | 0.501 | 0.146 | 29 |
| Coronene | 7 | 0.697 | 0.090 | 13 |
| Methylcoronene | 7 | 0.463 | 0.035 | 8 |
| Naphthenocoronene | 7 | 0.222 | 0.012 | 5 |
| Dibenzoperylene | 7 | 0.007 | ** | ** |
| Benzocoronene | 9 | 0.051 | ** | ** |
| Ovalene | 10 | 0.040 | ** | ** |
| Total | — | 1.981 | 0.283 | 14 |
| Total HPNA 7R+ | 7+ | 1.480 | 0.137 | 9 |

** The concentrations of dibenzoperylene, benzocoronene, and ovalene in the desorbed solvent was difficult to determine due to the scale of the experiment and the detection limits of the measurement equipment.

A first aspect of the present disclosure may be directed to a process for treating a hydrocarbon stream to remove polynuclear aromatic compounds, heavy polynuclear aromatic compounds, or both. The process may include contacting the hydrocarbon stream with an adsorbent in an adsorption unit, where the contacting causes at least a portion of the polynuclear aromatic compounds, heavy polynuclear aromatic compounds, or both in the hydrocarbon stream to be adsorbed onto the adsorbent to produce a treated hydrocarbon stream. The process may further include regenerating the adsorbent in the adsorption unit. Regenerating the adsorbent may include at least ceasing contact of the hydrocarbon stream with the adsorbent and contacting the adsorbent with a solvent comprising a disulfide oil. Contacting the adsorbent with the solvent comprising the disulfide oil may desorb at least a portion of the polynuclear aromatic compounds, the heavy polynuclear aromatic compounds, or both from the adsorbent into the solvent to produce a desorption effluent comprising the at least a portion of the polynuclear aromatic compounds, the heavy polynuclear aromatic compounds, or both.

A second aspect of the present disclosure may include the first aspect, where regenerating the adsorbent may further comprise, before contacting the adsorbent with the solvent comprising the disulfide oil, contacting the adsorbent with a paraffinic solvent, where contacting desorbs non-PNA and non-HPNA hydrocarbons from pores, void spaces, or both of the adsorbent, and passing an inert gas through the adsorbent to dry the adsorbent.

A third aspect of the present disclosure may include either one of the first or second aspects, where at least a portion of the hydrocarbon stream may comprise a hydrocarbon feed for a hydrocracking process, the hydrocarbon feed comprising at least polynuclear aromatic compounds.

A fourth aspect of the present disclosure may include any one of the first through third aspects, where at least a portion of the hydrocarbon stream may comprise a hydrocracker bottom stream comprising heavy polynuclear aromatic compounds and the desorption effluent may comprise at least a portion of the heavy polynuclear aromatic compounds from the hydrocracker bottoms.

A fifth aspect of the present disclosure may include any one of the first through fourth aspects, where the solvent consists or consists essentially of disulfide oil.

A sixth aspect of the present disclosure may include any one of the first through fourth aspects, further comprising combining the disulfide oil with at least one secondary solvent upstream of the adsorption unit to produce the solvent and then passing the solvent to the adsorption unit during regeneration of the adsorbent.

A seventh aspect of the present disclosure may include any one of the first through fourth aspects, where the solvent comprises the disulfide oil as a primary solvent and at least one secondary solvent.

An eighth aspect of the present disclosure may include any one of the sixth or seventh aspects, where the secondary solvent is selected from the group consisting of benzene, toluene, xylene, tetrahydrofuran, a heavy naphtha stream having a boiling point temperature range of from 70° C. to 140° C., or combinations of these.

A ninth aspect of the present disclosure may include any one of the first through eighth aspects, further comprising contacting a mercaptan-containing hydrocarbon stream with an oxygen-containing gas and an alkaline solution in the presence of a mercaptan oxidation catalyst, where the contacting may cause at least a portion of the mercaptan in the mercaptan-containing hydrocarbon stream to react to produce a mercaptan oxidation effluent comprising at least the disulfide oil, treating the mercaptan oxidation effluent to produce at least a disulfide oil effluent comprising at least a portion of the disulfide oil, and passing at least a portion of the disulfide oil effluent to the adsorption unit as at least a portion of the solvent for regeneration of the adsorbent.

A tenth aspect of the present disclosure may include any one of the first through ninth aspects, further comprising recovering the polynuclear aromatic compounds, the heavy polynuclear aromatic compounds, or both from the desorption effluent.

An eleventh aspect of the present disclosure may include any one of the first through tenth aspects, further comprising passing the desorption effluent to a desorption separation system that may separate the desorption effluent into a recycle solvent comprising at least disulfide oil and a desorption bottom stream comprising at least a portion of the polynuclear aromatic compounds, the heavy polynuclear aromatic compounds, or both.

A twelfth aspect of the present disclosure may include the eleventh aspect, further comprising passing at least a portion of the recycle solvent from the desorption separation system to the adsorption unit for further regeneration of the adsorbents.

A thirteenth aspect of the present disclosure may include any one of the eleventh or twelfth aspects, further comprising combining at least a portion of the recycle solvent with the solvent upstream of the adsorption unit.

A fourteenth aspect of the present disclosure may be directed to a process for upgrading a hydrocarbon feed. The process may include contacting the hydrocarbon feed with an adsorbent in an adsorption unit, where the contacting causes at least a portion of polynuclear aromatic compounds, heavy polynuclear aromatic compounds, or both in the hydrocarbon feed to be adsorbed onto the adsorbent to produce a treated hydrocarbon stream. The process may further include contacting at least a portion of the treated hydrocarbon stream with hydrogen in the presence of at least one hydrocracking catalyst to produce a hydrocracker effluent and separating the hydrocracker effluent into at least one upgraded effluent and a hydrocracker bottom stream. The process may further include regenerating the adsorbent in the adsorption unit. Regenerating the adsorbent may include contacting the adsorbent with a solvent comprising a disulfide oil, where contacting the adsorbent with the solvent comprising the disulfide oil may desorb at least a portion of the polynuclear aromatic compounds, heavy polynuclear aromatic compounds, or both from the adsorbent into the solvent to produce a desorption effluent comprising the at least a portion of the polynuclear aromatic compounds, heavy polynuclear aromatic compounds, or both.

A fifteenth aspect of the present disclosure may include the fourteenth aspect, wherein the hydrocarbon feed may comprise a vacuum gas oil.

A sixteenth aspect of the present disclosure may include either one of the fourteenth or fifteenth aspects, wherein the hydrocarbon feed may further comprise demetalized oil, deasphalted oil, or both.

A seventeenth aspect of the present disclosure may include any one of the fourteenth through sixteenth aspects, where the disulfide oil may comprise at least a portion of a disulfide oil effluent from a mercaptan oxidation unit.

An eighteenth aspect of the present disclosure may include any one of the fourteenth through seventeenth aspects, where the disulfide oil may have a Hildebrand solubility parameter of greater than or equal to 16 $MPa^{1/2}$.

A nineteenth aspect of the present disclosure may include any one of the fourteenth through eighteenth aspects, where the solvent may comprise from 50 weight percent to 100 weight percent disulfide oil.

A twentieth aspect of the present disclosure may include any one of the fourteenth through nineteenth aspects, where the solvent may comprise the disulfide oil and one or more secondary solvents selected from the group consisting of benzene, toluene, xylenes, tetrahydrofuran, a heavy naphtha stream having a boiling point temperature range of from 70° C. to 140° C., or combinations of these.

A twenty-first aspect of the present disclosure may include any one of the fourteenth through twentieth aspects, further comprising combining the disulfide oil with at least one secondary solvent to produce the solvent.

A twenty-second aspect of the present disclosure may include any one of the fourteenth through twenty-first aspects, further comprising contacting a mercaptan-containing hydrocarbon stream with an oxygen-containing gas and an alkaline solution in the presence of a mercaptan oxidation catalyst, where the contacting may cause at least a portion of the mercaptan in the mercaptan-containing hydrocarbon stream to react to produce a mercaptan oxidation effluent comprising at least the disulfide oil, treating the mercaptan oxidation effluent to produce at least a disulfide oil effluent comprising at least a portion of the disulfide oil, and passing at least a portion of the disulfide oil effluent to the adsorption unit as at least a portion of the solvent for regeneration of the adsorbent.

A twenty-third aspect of the present disclosure may include any one of the fourteenth through twenty-second aspects, further comprising recovering at least a portion of the polynuclear aromatic compounds, heavy polynuclear aromatic compounds, or both from the desorption effluent.

A twenty-fourth aspect of the present disclosure may include any one of the fourteenth through twenty-third aspects, further comprising passing the desorption effluent to a desorption separation system that may separate the desorption effluent into a recycle solvent comprising at least disulfide oil and a desorption bottom stream comprising at least a portion of the polynuclear aromatic compounds, the heavy polynuclear aromatic compounds, or both.

A twenty-fifth aspect of the present disclosure may include the twenty-fourth aspect, further comprising passing at least a portion of the recycle solvent from the desorption separation system to the adsorption unit for further regeneration of the adsorbent.

A twenty-sixth aspect of the present disclosure may include either one of the twenty-fourth or twenty-fifth aspects, further comprising combining at least a portion of the recycle solvent with the solvent upstream of the adsorption unit.

A twenty-seventh aspect of the present disclosure may include any one of the fourteenth through twenty-sixth aspects, further comprising passing at least a portion of the hydrocracker bottom stream to the adsorption unit and contacting the at least a portion of the hydrocracker bottom stream with the adsorbent in the adsorption unit, where the contacting may cause at least a portion of polynuclear aromatic compounds, heavy polynuclear aromatic compounds, or both from the hydrocracker bottom stream to adsorb onto the adsorbent.

A twenty-eighth aspect of the present disclosure may include any one of the fourteenth through twenty-seventh aspects, where the adsorbent includes at least one of activated carbon, Attapulgus clay, spent catalysts, silica, alumina, titania, zeolite, or combinations of these.

A twenty-ninth aspect of the present disclosure may include any one of the fourteenth through twenty-eighth aspects, comprising adsorbing at least 95 percent by weight of the polynuclear aromatic compounds, heavy polynuclear aromatic compounds, or both from the hydrocarbon feed, the hydrocracker bottom stream, or both.

A thirtieth aspect of the present disclosure may include any one of the fourteenth through twenty-ninth aspects, where regenerating the adsorbent may further comprise, before contacting the adsorbent with the solvent comprising the disulfide oil, contacting the adsorbent with a paraffinic solvent, where contacting may desorb non-PNA and non-HPNA hydrocarbons from pores, void spaces, or both of the adsorbent and passing an inert gas through the adsorbent to dry the adsorbent.

A thirty-first aspect of the present disclosure may be directed to a system for processing a hydrocarbon feed. The system may include an adsorption unit comprising an adsorbent and operable to contact the hydrocarbon feed with the adsorbent to adsorb at least a portion of polynuclear aromatic compounds, heavy polynuclear aromatic compounds, or both from the hydrocarbon feed to produce a treated hydrocarbon stream. The system may further include a hydrocracking unit disposed downstream of the adsorption unit and comprising at least one hydrocracking catalyst. The hydrocracking unit may be operable to contact at least a portion of the treated hydrocarbon stream with hydrogen in the presence of the at least one hydrocracking catalyst at conditions sufficient to convert at least a portion of the treated hydrocarbon stream to produce a hydrocracked effluent comprising hydrocarbons having a boiling point temperature less than or equal to 370° C. The system may further include a mercaptan oxidation unit that may be operable to convert at least a portion of mercaptan in a mercaptan-containing hydrocarbon stream to disulfide oil. The mercaptan oxidation unit may be in fluid communication with the adsorption unit to pass at least a portion of a disulfide oil effluent from the mercaptan oxidation unit to the adsorption unit as at least a portion of a solvent for regeneration of the adsorbent.

A thirty-second aspect of the present disclosure may include the thirty-first aspect, further comprising a hydrocracked effluent separation system downstream of the hydrocracking unit, where the hydrocracked effluent separation system may be operable to separate at least a portion of the hydrocracked effluent into at least one lesser-boiling effluent and a hydrocracker bottom stream.

A thirty-third aspect of the present disclosure may include the thirty-second aspect, where the hydrocracked effluent separation system may be in fluid communication with the adsorption unit to pass at least a portion of the hydrocracker bottom stream from the hydrocracked effluent separation system to the adsorption unit, where the adsorption unit is operable to remove at least a portion of heavy polynuclear aromatic compounds, polynuclear aromatic compounds, or both from the hydrocracker bottom stream.

A thirty-fourth aspect of the present disclosure may include either one of the thirty-second or thirty-third aspects, where the hydrocracked effluent separation system may comprise a high temperature separator and a fractionator downstream of the high temperature separator.

A thirty-fifth aspect of the present disclosure may include any one of the thirty-first through thirty-fourth aspects, further comprising a desorption separation system downstream of the adsorption unit, the desorption separation system operable to separate the desorption effluent into a recycle solvent and a desorption bottom stream.

A thirty-sixth aspect of the present disclosure may include any one of the thirty-first through thirty fifth aspects, where the desorption separation system may be in fluid communication with the adsorption unit to pass the recycle solvent from the desorption separation system back to the adsorption unit.

A thirty-seventh aspect of the present disclosure may include any one of the thirty-first through thirty-sixth aspects, further comprising a solvent blending unit in fluid communication with the mercaptan oxidation unit and the adsorption unit, the solvent blending unit operable to combine the disulfide oil effluent from the mercaptan oxidation unit with one or more secondary solvents to produce the solvent for regeneration of the adsorbent.

A thirty-eighth aspect of the present disclosure may include any one of the thirty-first through thirty-seventh aspects, further comprising a desorption separation unit operable to separate the desorption effluent into a recycle solvent and a desorption bottom stream, and a solvent blending unit in fluid communication with the mercaptan oxidation unit and the adsorption unit, the solvent blending unit operable to combine the disulfide oil effluent from the mercaptan oxidation unit with one or more secondary solvents to produce the solvent for regeneration of the adsorbent. The solvent blending unit may be in fluid communication with the desorption separation unit so that the recycle solvent can be passed from the desorption separation unit to the solvent blending unit.

A thirty-ninth aspect of the present disclosure may include any one of the thirty-first through thirty-eighth aspects, where the mercaptan oxidation unit may comprise a mercaptan oxidation reactor comprising a mercaptan oxidation catalyst, the mercaptan oxidation reactor operable to contact the mercaptan-containing hydrocarbon stream with an oxygen-containing gas and an alkaline solution in the presence of the mercaptan oxidation catalyst to produce a mercaptan oxidation effluent comprising the disulfide oil.

A fortieth aspect of the present disclosure may include the thirty-seventh aspect, where the mercaptan oxidation unit may further comprise a mercaptan oxidation effluent treatment system operable to treat the mercaptan oxidation effluent to produce at least a disulfide oil effluent.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for treating a hydrocarbon stream to remove polynuclear aromatic compounds, heavy polynuclear aromatic compounds, or both, the process comprising:

contacting the hydrocarbon stream with an adsorbent in an adsorption unit, where the contacting causes at least a portion of the polynuclear aromatic compounds, heavy polynuclear aromatic compounds, or both in the hydrocarbon stream to be adsorbed onto the adsorbent to produce a treated hydrocarbon stream; and regenerating the adsorbent in the adsorption unit, where regenerating the adsorbent comprises:

ceasing contact of the hydrocarbon stream with the adsorbent;

contacting the adsorbent with a paraffinic solvent, where contacting desorbs non-PNA and non-HPNA hydrocarbons from pores, void spaces, or both of the adsorbent; and contacting the adsorbent with a solvent comprising a disulfide oil, where contacting the adsorbent with the solvent comprising the disulfide oil desorbs at least a portion of the polynuclear aromatic compounds, the heavy polynuclear aromatic compounds, or both from the adsorbent into the solvent to produce a desorption effluent comprising at least a portion of the polynuclear aromatic compounds, the heavy polynuclear aromatic compounds, or both.

2. The process of claim 1, where after contacting the adsorbent with a paraffinic solvent, passing an inert gas through the adsorbent to dry the adsorbent.

3. The process of claim 1, where at least a portion of the hydrocarbon stream comprises a hydrocarbon feed for a hydrocracking process, the hydrocarbon feed comprising at least polynuclear aromatic compounds.

4. The process of claim 1, where at least a portion of the hydrocarbon stream comprises a hydrocracker bottom stream comprising heavy polynuclear aromatic compounds and the desorption effluent comprises at least a portion of the heavy polynuclear aromatic compounds from the hydrocracker bottoms.

5. The process of claim 1, further comprising combining the disulfide oil with at least one secondary solvent upstream of the adsorption unit to produce the solvent and then passing the solvent to the adsorption unit during regeneration of the adsorbent.

6. The process of claim 5, where the secondary solvent is selected from the group consisting of benzene, toluene, xylene, tetrahydrofuran, a heavy naphtha stream having a boiling point temperature range of from 70° C. to 140° C., or combinations of these.

7. The process of claim 1, further comprising:

contacting a mercaptan-containing hydrocarbon stream with an oxygen-containing gas and an alkaline solution in the presence of a mercaptan oxidation catalyst, where the contacting causes at least a portion of the mercaptan in the mercaptan-containing hydrocarbon stream to react to produce a mercaptan oxidation effluent comprising at least the disulfide oil;

treating the mercaptan oxidation effluent to produce at least a disulfide oil effluent comprising at least a portion of the disulfide oil; and passing at least a portion of the disulfide oil effluent to the adsorption unit as at least a portion of the solvent for regeneration of the adsorbent.

8. The process of claim 1, further comprising passing the desorption effluent to a desorption separation system that separates the desorption effluent into a recycle solvent comprising at least disulfide oil and a desorption bottom stream comprising at least a portion of the polynuclear aromatic compounds, the heavy polynuclear aromatic compounds, or both.

9. A process for upgrading a hydrocarbon feed, the process comprising:

contacting the hydrocarbon feed with an adsorbent in an adsorption unit, where the contacting causes at least a portion of polynuclear aromatic compounds, heavy polynuclear aromatic compounds, or both in the hydrocarbon feed to be adsorbed onto the adsorbent to produce a treated hydrocarbon stream;

contacting at least a portion of the treated hydrocarbon stream with hydrogen in the presence of at least one hydrocracking catalyst to produce a hydrocracker effluent;

separating the hydrocracker effluent into at least one upgraded effluent and a hydrocracker bottom stream; and regenerating the adsorbent in the adsorption unit, where regenerating the adsorbent comprises:

contacting the adsorbent with a paraffinic solvent, where contacting desorbs non-PNA and non-HPNA hydrocarbons from pores, void spaces, or both of the adsorbent; and contacting the adsorbent with a solvent comprising a disulfide oil, where contacting the adsorbent with the solvent comprising the disulfide oil desorbs at least a portion of the polynuclear aromatic compounds, heavy polynuclear aromatic compounds, or both from the adsorbent into the solvent to produce a desorption effluent comprising at least a portion of the polynuclear aromatic compounds, heavy polynuclear aromatic compounds, or both.

10. The process of claim 9, wherein the hydrocarbon feed comprises a vacuum gas oil, and optionally a demetalized oil, deasphalted oil, or both.

11. The process of claim 9, where the solvent comprises the disulfide oil and one or more secondary solvents selected from the group consisting of benzene, toluene, xylenes, tetrahydrofuran, a heavy naphtha stream having a boiling point temperature range of from 70° C. to 140° C., or combinations of these.

12. The process of claim 9, further comprising:

contacting a mercaptan-containing hydrocarbon stream with an oxygen-containing gas and an alkaline solution in the presence of a mercaptan oxidation catalyst, where the contacting causes at least a portion of the mercaptan in the mercaptan-containing hydrocarbon stream to react to produce a mercaptan oxidation effluent comprising at least the disulfide oil;

treating the mercaptan oxidation effluent to produce at least a disulfide oil effluent comprising at least a portion of the disulfide oil; and passing at least a portion of the disulfide oil effluent to the adsorption unit as at least a portion of the solvent for regeneration of the adsorbent.

13. The process of claim 9, further comprising passing at least a portion of the hydrocracker bottom stream to the adsorption unit and contacting the at least a portion of the hydrocracker bottom stream with the adsorbent in the adsorption unit, where the contacting causes at least a portion of polynuclear aromatic compounds, heavy polynuclear aromatic compounds, or both from the hydrocracker bottom stream to adsorb onto the adsorbent.

14. The process of claim 9, where the adsorbent includes at least one of activated carbon, Attapulgus clay, spent catalysts, silica, alumina, titania, zeolite, or combinations of these.

15. A system for processing a hydrocarbon feed, the system comprising:
- an adsorption unit comprising an adsorbent and operable to contact the hydrocarbon feed with the adsorbent to adsorb at least a portion of polynuclear aromatic compounds, heavy polynuclear aromatic compounds, or both from the hydrocarbon feed to produce a treated hydrocarbon stream;
- a hydrocracking unit disposed downstream of the adsorption unit and comprising at least one hydrocracking catalyst, the hydrocracking unit operable to contact at least a portion of the treated hydrocarbon stream with hydrogen in the presence of the at least one hydrocracking catalyst at conditions sufficient to convert at least a portion of the treated hydrocarbon stream to produce a hydrocracked effluent comprising hydrocarbons having a boiling point temperature less than or equal to 370° C.; and
- a mercaptan oxidation unit operable to convert at least a portion of mercaptan in a mercaptan-containing hydrocarbon stream to disulfide oil, where the mercaptan oxidation unit is in fluid communication with the adsorption unit to pass at least a portion of a disulfide oil effluent from the mercaptan oxidation unit to the adsorption unit as at least a portion of a solvent for regeneration of the adsorbent.

16. The system of claim 15, further comprising a hydrocracked effluent separation system downstream of the hydrocracking unit, the hydrocracked effluent separation system operable to separate at least a portion of the hydrocracked effluent into at least one lesser-boiling effluent and a hydrocracker bottom stream.

17. The system of claim 16, where the hydrocracked effluent separation system is in fluid communication with the adsorption unit to pass at least a portion of the hydrocracker bottom stream from the hydrocracked effluent separation system to the adsorption unit, where the adsorption unit is operable to remove at least a portion of heavy polynuclear aromatic compounds, polynuclear aromatic compounds, or both from the hydrocracker bottom stream.

18. The system of claim 15, further comprising a desorption separation system downstream of the adsorption unit, the desorption separation system operable to separate the desorption effluent into a recycle solvent and a desorption bottom stream, where the desorption separation system is in fluid communication with the adsorption unit to pass the recycle solvent from the desorption separation system back to the adsorption unit.

19. The system of claim 15, further comprising a solvent blending unit in fluid communication with the mercaptan oxidation unit and the adsorption unit, the solvent blending unit operable to combine the disulfide oil effluent from the mercaptan oxidation unit with one or more secondary solvents to produce the solvent for regeneration of the adsorbent.

20. The system of claim 15, further comprising:
- a desorption separation unit operable to separate the desorption effluent into a recycle solvent and a desorption bottom stream; and
- a solvent blending unit in fluid communication with the mercaptan oxidation unit and the adsorption unit, the solvent blending unit operable to combine the disulfide oil effluent from the mercaptan oxidation unit with one or more secondary solvents to produce the solvent for regeneration of the adsorbent;
- where the solvent blending unit is in fluid communication with the desorption separation unit so that the recycle solvent is passed from the desorption separation unit to the solvent blending unit.

* * * * *